United States Patent
Cowan

(10) Patent No.: US 8,254,029 B2
(45) Date of Patent: Aug. 28, 2012

(54) SURFACE RELIEF VOLUME REFLECTIVE DIFFRACTIVE STRUCTURE

(75) Inventor: James J. Cowan, Lexington, MA (US)

(73) Assignee: Aztec Systems, Inc., Lexington, MA (US)

( * ) Notice: Subject to any disclaimer, the term of this patent is extended or adjusted under 35 U.S.C. 154(b) by 762 days.

(21) Appl. No.: 12/031,381

(22) Filed: Feb. 14, 2008

(65) Prior Publication Data
US 2008/0309996 A1    Dec. 18, 2008

Related U.S. Application Data

(60) Provisional application No. 60/901,579, filed on Feb. 14, 2007.

(51) Int. Cl.
*G02B 5/18* (2006.01)

(52) U.S. Cl. ............... 359/572; 359/574; 359/576

(58) Field of Classification Search .............. None
See application file for complete search history.

(56) References Cited

U.S. PATENT DOCUMENTS

| | | | |
|---|---|---|---|
| 3,718,078 A | 2/1973 | Plummer | 95/49 |
| 3,834,786 A | 9/1974 | Carlsen | 350/3.5 |
| 4,298,249 A | 11/1981 | Gloor et al. | 350/338 |
| 4,402,571 A | 9/1983 | Cowan et al. | 350/162.17 |
| 4,802,737 A | 2/1989 | Denton | 350/166 |
| 4,839,250 A | 6/1989 | Cowan | 430/1 |
| 4,841,341 A | 6/1989 | Ogawa et al. | 355/43 |
| 4,874,213 A | 10/1989 | Cowan | 350/3.67 |
| 4,888,260 A | 12/1989 | Cowan | 430/1 |
| 4,999,234 A | 3/1991 | Cowan | 428/156 |
| 5,004,673 A | 4/1991 | Vlannes | 430/325 |
| 5,600,462 A | 2/1997 | Suzuki et al. | 349/112 |
| 5,631,754 A | 5/1997 | Jannson et al. | 349/64 |
| 5,771,328 A | 6/1998 | Wortman et al. | 385/146 |
| 6,076,933 A | 6/2000 | DiLoreto et al. | 359/614 |
| 6,081,376 A | 6/2000 | Hansen et al. | 359/485 |
| 6,096,666 A | 8/2000 | Jachimowicz et al. | 442/188 |
| 6,348,995 B1 | 2/2002 | Hansen et al. | 359/486 |
| 6,400,509 B1 | 6/2002 | Sappey et al. | 359/571 |
| 6,608,722 B2 | 8/2003 | Cowan et al. | 359/599 |

(Continued)

FOREIGN PATENT DOCUMENTS

EP    0 322 790 A1    7/1989

(Continued)

OTHER PUBLICATIONS

Cowan, J.J., "Aztec Surface-Relief Volume Diffractive Structure", *Journal of the Optical Society of America*, pp. 1529-1544 (1990).
European Search Report for European Application No. 05753948.8 mailed on Aug. 26, 2009.
Cowan, J.J., "Advances in holographic replication with the Aztec Structure", *Proceeding of International Conference on Holography*, pp. 1-5, (2006).

(Continued)

*Primary Examiner* — Arnel C Lavarias
(74) *Attorney, Agent, or Firm* — Gilman Clark & Hunter LLC

(57) ABSTRACT

A surface relief structure includes a recording medium configured to be structurally modified when exposed to interfering and non-interfering portions of radiation beams, the structurally modified recording medium including, when viewed in a two-dimensional cross-section along one of the axes of the recording medium a plurality of equally spaced steps of fine-sized periodicity superimposed upon a plurality of deep depressions of substantially coarse-sized periodicity. The structurally modified recording medium is configured to produce in reflection single and multiple colors in a broad spectral range when illuminated by a source of light.

19 Claims, 23 Drawing Sheets

U.S. PATENT DOCUMENTS

| | | | |
|---|---|---|---|
| 6,707,518 B1 * | 3/2004 | Cowan | 349/113 |
| 6,940,665 B2 | 9/2005 | Cowan et al. | 359/900 |
| 7,221,512 B2 | 5/2007 | Steenblik et al. | 359/569 |
| 2002/0090578 A1 | 7/2002 | Schaefera et al. | |
| 2002/0141065 A1 * | 10/2002 | Cowan et al. | 359/599 |
| 2003/0232179 A1 | 12/2003 | Steenblik et al. | 428/195 |

FOREIGN PATENT DOCUMENTS

| | | |
|---|---|---|
| WO | WO 95/04303 | 2/1995 |
| WO | WO 03/098276 | 11/2003 |

OTHER PUBLICATIONS

Cowan, J., "The Aztec Structure: an Improved Replicable Security Device", SPIE Electronic Imaging Conference on Optical Security and Counterfeit Deterrence Techniques, Jan. 17-19, 2006 in San Jose, *SPIE*, vol. 6075, Paper 6075-25.

International Search Report and the Written Opinion of the International Searching Authority, for PCT/US08/02008, mailed Jun. 2, 2008.

* cited by examiner

US 8,254,029 B2

SURFACE RELIEF VOLUME REFLECTIVE DIFFRACTIVE STRUCTURE

CROSS-REFERENCE TO RELATED APPLICATIONS

This application claims priority to provisional U.S. application Ser. No. 60/901,579, entitled "Volume Surface Relief Phase Reflection Holograms", and filed Feb. 14, 2007, the content of which is hereby incorporated by reference in its entirety.

BACKGROUND

The present invention relates to surface relief-volume reflective diffractive structures, and methods and systems for producing such structures, and more particularly to surface relief-volume reflective diffractive structures for easily recording replicable, single and multicolor diffractive images, and methods and systems for producing such structures.

Conventional surface relief diffractive structures generally include a shallow edge profile, e.g., 100-300 nanometers, that is sinusoidal in shape and has a pitch, or spacing between maxima of the sine wave profile, of around one micrometer. Such a shallow profile generally enables relatively easy mechanical replication of the structure. The shallow profile of such surface relief structures resulting from an initial recording of an object's image, using continuous wave laser light, in the photosensitive material diazonaphthoquinone, commonly known as AZ photoresist, or simply, photoresist. The recording geometry generally included two beams of light, in which one beam, corresponding to light from an object (i.e., "object" beam) interferes with a second beam (the "reference" beam). Both beams are initially incident on the same side of the recording medium such that the resultant interference fringes are mainly perpendicular to the surface. This exposure technique is referred to as an "off-axis" exposure, since both beams are at an angle with respect to the normal to the surface. Photoresist material has the property that when exposed and developed, the material is removed (etched) from the top surface downwards in proportion to the exposure intensity. For a typical hologram, such exposure intensity is sinusoidal in nature such that the resulting surface of photoresist has a sine wave variation in depth. One technique to mechanically replicate the developed photoresist, the photoresist is coated with a layer of conductive metal and converted into a hard nickel replica through electroplating techniques. The hard nickel replica can then be used to impress the surface pattern into plastic using, for example, heat and pressure, or through ultraviolet casting. The typical diffraction spectrum from a hologram formed in this way covers the realm of the entire visual range from blue to red, or about 400 to 700 nanometers (thus, the resultant holograms are referred to as "rainbow holograms"). It is not feasible to produce with shallow surface relief structures single, individual, color holograms.

Individual colors can be made holographically with a different type of diffractive device called a volume reflection hologram (or sometimes volume phase reflection hologram). In this case, the object and reference light beams are brought into the recording medium from opposite sides, and the interference structure that forms upon development is a set of planes separated by a distance half the wavelength of the incident light divided by the index of refraction of the medium. The spacing in this case is very fine. For example, with green light having a wavelength of 500 nanometers and a recording medium having an index of refraction of n=1.5, the fringe spacing is d=500/(2×1.5)=167 nanometers. For this structure a different medium than photoresist is generally used. Typical recording materials include dichromated gelatin (DCG), photopolymer, and silver halide. These diffractive planes are not surface relief structures, but rather include regions of different indices of refraction induced by the exposure. In reconstruction of the recorded image with incident white light, a small portion of light is reflected from each of the interference planes, and because of the half-wavelength spacing, the reflected light is coherent with reflection from all the other planes. The coherently reflected light is viewed as a single color that is the same as the color of the original recording light. The remaining colors are incoherently scattered out of the field of view. Because the fringe structure includes of a set of parallel planes distributed throughout the medium, there is no surface relief structure that can be mechanically replicated. Thus, replication of these volume holograms is performed optically, using, for example, a laser exposure on a production line.

Another technique for recording holographic images is one predicated on using a recording geometry similar to that used for recording volume holograms (i.e., directing the object beam and reference beams from opposite sides of the recording medium) to record the interfering and non-interfering patterns in a thick layer of photoresist, so that two sets of interference fringes are formed that are perpendicular to each other. When this recording is developed, etching of the photoresist proceeds in a manner similar to the recording of thin-layer photoresist media due to the off-axis exposure. However, because of the additional planes produced from the counter propagating beams, the resultant sine wave profile becomes modified into a stepped profile, with the steps separated by a half-wavelength, as with the volume case. In this case the profile has the appearance, from the edge, of a stepped pyramid (thus inspiring the name given to the structure of an AZTEC structure which due to the resemblance of the resultant structure to Aztec temple pyramid, and also because Aztec is a useful mnemonic of the recording technique diazo photoresist technology). Resultant stepped-pyramid structures can be mechanically replicated in a manner similar to the mechanical replication of shallow surface relief structures. Such stepped-pyramid structures also produce, upon illumination by a light sources, a single-colors in reflection (i.e., each point of the reflected image includes a single color, related to the original recording color, rather than a rainbow of colors produced when a shallow surface relief structure is illuminated.

While Aztec structures formed in this way do demonstrate properties of volume holograms, there are some significant differences in the diffraction characteristics. Because the recording is done by two separate exposures, one surface and one volume, the diffracted light has properties of both. The stepped structure does indeed produce single color reflected light. However, because it is a surface relief structure, it also produces rainbow reflected light as well. The single color light appears primarily on-axis, while the rainbow light appears predominantly off-axis.

Another feature of conventional holographic recording techniques and systems is that the recording of holographic images into photoresist layers requires use of blue or shorter wavelength light, and thus many of the recording geometries of conventional system produced images that are restricted to the blue end of the visible spectrum.

SUMMARY

It would therefore be desirable to produce a replicable surface relief structure that exhibits the single color reflective property of volume holograms and the property of suppressing and/or modifying the off-axis rainbow colors. It would thus be desirable to provide an improved Aztec type diffractive device which accomplishes this objective.

It would also be desirable to have recording techniques and systems that enable Aztec diffractive devices to be easily produced and which enable viewability throughout the entire visible spectrum.

The present disclosure provides significant improvement over systems, techniques and structures described in such issued patents as U.S. Pat. No. 4,888,260, U.S. Pat. No. 4,874, 213, U.S. Pat. No. 4,839,250, and U.S. Pat. No. 4,999,234, the contents of all of which is hereby incorporated by reference in their entireties. These issued patents described techniques and systems to enable making mechanically replicable surface relief diffractive structures that would exhibit properties similar to those of volume diffractive structures.

More particularly, the present disclosure relates to Aztec structures that are configured such that the diffracted light includes a single color component with the highest efficiency possible while suppressing or modifying in multicolor rainbow color components. This is achieved by altering the recording geometry such that high efficiency skewed symmetric and asymmetric groove profiles are produced in a recording medium, and also by taking advantage of resulting diffraction efficiency characteristics of these particular surface relief structures with respect to those of typical volume structures. The disclosure provided herein has two central aspects. The first aspect pertains to a general theoretical consideration for deep structured surface relief profiles that can be produced by a variety of techniques. The second aspect pertains to fabrication techniques utilizing holographic techniques.

To illustrate properties of the Aztec structures, reference is made to FIGS. 19 and 20. Particularly, FIG. 19 provides a comparison of the diffraction efficiencies in reflection of surface relief gratings as a function of depth for two case: a) a surface grating having no steps, 2) the same surface grating containing well defined equally spaced steps that demonstrate volume effects. With respect to the first case, the structure could be, for example, a sine wave profile for which the surface efficiency varies as a Bessel function, reaching a maximum at a certain depth and then decreasing to zero. For a triangular profile, the efficiency varies as a cosine squared function, also rising to a maximum and then decreasing. FIG. 19B shows the diffraction efficiency as a function of depth for the zero and the +1 and −1 orders for a non-symmetric triangular grating (shown in FIG. 19A) with a center point displaced from 0.5 of the grating period to 0.65 of the period), with no steps. To compute the diffraction efficiency, the Grating Solver™ program (v. 4.20) was used to perform full vector calculation for a grating period of 3.5 microns and 500 nanometer p-polarized light at normal incidence. As shown, the +1 and −1 reflected orders are seen to rise to a maximum at relatively shallow depths and then decrease to nearly zero at large depths. Because of the skewed symmetry, the +1 and −1 orders are not equal, thus demonstrating the partial blaze for this structure. A significant change in the diffracted light occurs when the step structure is added. For incident light having a wavelength of 500 nanometers, a resonance is expected for a step height that is half the wavelength, or 250 nanometers, where the dielectric layer covering the steps is taken to be air, with an index of refraction, n=1. Referring to FIG. 19D, the diffraction efficiency, as a function of depth, is computed for a grating having three equally spaced steps (as shown in FIG. 19C). Maximum diffraction efficiency is seen to occur when the grating depth is equal to three steps, i.e., 750 nanometers. Referring to FIG. 19F, the diffraction efficiency, as a function of depth, is computed for a grating structure having a height of five (5) steps (as shown in FIG. 19E), with each step having an individual height of 250 nanometer. As shown, maximum diffraction efficiency occurs when the grating depth is equal to five steps, i.e., 1250 nanometers. These results for the volume step structure effects can be compared with the general results for a conventional volume structure such as silver halide or DCG, for example, for which the efficiency varies as a hyperbolic function that slowly rises to a constant maximum value as the fringe structure reaches a maximum stage of development.

Referring to FIG. 20, the diffraction efficiency results in reflection for spectral scans from 300 to 800 nanometers for three cases of the grating profiles of FIG. 19 (i.e., the profiles shown in FIGS. 19A, 19C and 19E) are shown. FIG. 20A is a graph of the diffraction efficiency, as a function of wavelength, for a grating profile having a depth of 1200 nanometers (non-symmetric profile, s-polarization, and normal incidence) without any step structure. As seen from the graph, there is no resonance behavior and practically no light is diffracted. FIG. 20B is a graph of the diffraction efficiency, as a function of wavelength, for a grating profile having three steps, each with a height of 250 nanometers, or a fixed depth of 750 nanometers. Here too, s-polarization, and normal incidence were assumed for computation of the results. As shown, for this grating profile there is resonance that occurs at 500 nanometers. FIG. 20C is a graph of the diffraction efficiency, as a function of wavelength, for a grating profile having five (5) steps, 250 nanometers each, and a fixed depth of 1250 nanometers. Again, s-polarization, and normal incidence were assumed for computation of the results. As shown, because more steps were used in this profile, the resonance lobe at 500 nanometers is narrower than the resonance lobe that occurred for the profile having three steps because the bandwidth varies inversely to the number of steps. The structures and results shown in FIGS. 19 and 20 are examples of general considerations regarding gratings with and without step structures that could be formed by a variety of techniques.

Some theoretical aspects of stepped structures, using scalar diffraction theory, are described in the paper by J. J. Cowan entitled "Aztec Surface Relief Volume Diffractive Structure", Journal of the Optical Society of America, Vol. 7, No. 8, August, 1990, pp. 1529-1544, the content of which is hereby incorporated by reference in its entirety. In that paper diffraction efficiencies for purely symmetric and purely asymmetric profiles having two to ten steps were considered. It was shown that high diffraction efficiency resulted for both the symmetric and asymmetric profiles at a particular wavelength. However, asymmetric grating profiles enabled other wavelengths adjacent to the primary one to have high efficiencies as well. Additionally, experiments have shown that narrower color bands resulted from a greater number of steps in the profile, with a bandwidth proportional to the reciprocal of the number of steps. In the present disclosure, the theoretical aspects are extended to the more accurate full vector treatment, and calculations are performed with the software program provided by the Grating Solver Corporation.

Photoresist material, a recording medium that can be used in conjunction with the recording systems and techniques described herein, has its highest absorption in the ultraviolet range. The absorption drops off considerably in the visible range. Most recordings using holographic techniques for the typical surface relief hologram are thus performed with blue to violet light. For example, the 413 nanometer line of the krypton laser, the 441.6 nanometer line of the He—Cd laser, the 457 nanometer line of the argon gas laser or diode-pumped solid state laser, and the 468 nanometer line of the krypton gas laser may all be used in hologram recording systems. Longer wavelengths than these are generally not effective in recording wavelengths on photoresist materials. An additional consideration in the implementation of Aztec recording systems has to do with the fact that counter propagating light has to be absorbed through a comparatively thick layer. This means that if the wavelength of the light is too short, absorption will take place in the first thickness layers and will be largely absorbed before it has a chance to form the volume fringes necessary for the stepped profile. Another consideration is the color shift phenomenon that occurs when a holographic image recorded in the photoresist medium is replicated in a plastic medium. The fringe spacing within the photoresist is half the wavelength of the recording light divided by the index of refraction of photoresist, which in the visible range approaches $n=1.7$. For an incident wavelength of 457 nanometers, the spacing is thus $457/(2\times1.7)=134$ nm. If this pattern is thus embossed into plastic having an index of $n=1.5$ and then viewed through the plastic base, the observed wavelength is $2\times134\times1.5=402$ nm, which is in the violet. Thus there is a significant color shift from 457 to 402 nanometers due entirely to the differences in the respective indices of refraction of the media involved.

These complications may be avoided by, for example, using a special prism coupling techniques and/or using non-typical replication materials. The prism coupling techniques used herein include coupling the prism employed directly into an actual embedded (i.e., encapsulated) object and/or coupling the prism to a volume phase hologram of an actual object. Non-typical replication materials include higher index materials than those conventionally used to thus minimize the color shifting.

With prism coupling, the object, whether actually encapsulated under a flat cover glass or in the form of a volume hologram recorded and embedded between flat glass plates, is first coated with a layer of photoresist and is then contacted to one face of a prism. The contact can be done in a number of ways, one of them being the use of a liquid contact layer such as xylene, which is an ideal index match for glass. Another effective contact method is the use of a melted gelatin mix. This could include, for example, one part gelatin granules mixed with four parts of water, that is then allowed to swell, and subsequently melted down. Applied as a heated liquid, the gelatin solidifies at room temperature. After exposure, the gelatin layer can simply be stripped away, allowing the photoresist layer to be developed. The incident recording laser light is incident through one of the other faces of the prism onto the object at an angle that is greater than the critical angle of reflection, defined by $\sin\theta=1/n$, where n in this case is the index of refraction of the prism. It is possible, using blue laser recording light, for the light to be incident at a large angle onto the object and to record counter propagating beams. The fringe pattern in this case is between the incident laser light and the light reflected from the object, both at large angles, such that the spacing is typical of the hologram colors such as green and/or red, rather than the color of the recording light. At the same time, because of the difference in index of refraction of the photoresist layer and the glass cover of either the object or the hologram, a portion of the incident light is reflected in the same general direction as the light reflected from the object, but at a small angle with respect to it. Initially, care is taken to tilt the actual object with respect to the cover glass, or if the object is in the form of a hologram, to have a built in tilt to the object at an appropriate viewing angle, usually in the range of 20 to 30 degrees from the normal.

The interference between the light reflected from the object and that reflected from the glass-photoresist interface forms a set or interference fringes that are tilted at a relatively large angle with respect to a normal to the surface and with relatively large spacing due to the small angle between the two beams. At the same time, the fine fringe pattern resulting from the interference between the incident light and the light reflected from the object is a set of parallel fringes that are inclined (or skewed) at a relatively shallow angle with respect to the surface. The resulting pattern from these two sets of interference fringes, upon exposure and development, is a stepped profile that is more asymmetric than symmetric.

During the development stage, the recording system takes advantage of the relative diffraction efficiencies of the two types of exposure—the off-axis and the volume. The off-axis efficiency varies roughly as a Bessel function, for an approximate sine wave depth profile, where the efficiency, as a function of etch depth, rises from zero to a maximum and then decreases again to zero. The volume efficiency, on the other hand, for a conventional non-surface-relief structure, varies with etch depth roughly as a hyperbolic function, rising slowly to a maximum value and then remaining at a large value for a large etch depth. For a stepped surface-relief volume structure, the efficiency rises to maximum values as each stepped layer is uncovered by the development process. Since the unwanted rainbow spectra arise from the off-axis exposure, their suppression depends on etching deep enough until the efficiency has cycled through the maximum value and has reached its minimum value. At the same time, deep etching produces a maximum efficiency of the volume exposure, which is the single color desired result. For surface-relief volume structures, the deeper the etching, the narrower the bandwidth of generated single color components.

Additional effects can arise from use of the above-discussed recording system configurations. With respect to the diffraction efficiency, it is possible, for a smaller number of steps, to have several efficiency peaks in the visible spectrum for separate colors. For example, if there are five steps in a grating profile, a real orthoscopic image of the object could be viewed at the intended viewing angle. However, if the developed hologram was tilted to the opposite angle from the normal, a pseudoscopic image could appear in a different color from the real image. For a larger number of steps, e.g., ten (10) to fifteen (15), it is possible to have several peaks, very closely spaced to each other, that fit under an envelope such that the observed diffracted light has the appearance of a single color. This has an advantage over typical monochromatic narrow-band volume holograms which isolate a narrow spectral band out of the whole visible spectrum. On the other hand, an envelope that encompasses several narrow-band wavelengths enables more light to be extracted from the visible spectrum, and thus the observed perceived single color is bright. This perceived single color can be varied, depending on the geometry of the stepped profile. A totally symmetric stepped profile (i.e., a profile in which the center point of the pyramid, the apex, is exactly halfway between minima constituting a period of the profile) having many steps will produce a predominantly single color component with high efficiency and several other color components at lower efficiency. On the other hand, a totally asymmetric stepped profile (i.e., a profile in which the top of the pyramid occurs just before the next step drops to the minimum of the next period of the profile), having a large number of steps will produce not only a predominant single color but all adjacent colors as well, which fit under an envelope that is typical of the diffraction character of a shallow blazed hologram. In the intermediate case (i.e., in situations in which the grating profile has a configuration of between that of a totally symmetric and totally asymmetric configurations) the primary (or resonance) wavelength is accompanied by a few adjacent wavelengths that are concentrated in a band that appears as the perceived single color. Furthermore, since the wavelength envelope includes several narrowband colors, the perceived depth of an image is also greater than it would have been for a single broadband color. For a conventional volume hologram a large depth is perceived when the color is nearly monochromatic, but at the same time the image is dim because of the narrow bandwidth. For an Aztec volume structure, on the other hand, the depth is perceived as large because of the narrowband nature of each resonant wavelength, but the image is bright because there are many closely spaced wavelengths.

In some embodiments, recording of an object can be performed by using a hologram of an object rather than an actual object. Recording an image in a surface relief structure using a hologram of an object rather than recording the actual object itself offers some advantages. Firstly, the required built-in tilt to provide the proper viewing angle can be done in a conventional way using a volume hologram such that when the copy is made into a recording medium (photoresist) there is no distortion of the object due to its tilt. With an actual embedded (encapsulated) object, such distortion is generally unavoidable. Another advantage is related to the amount of light that can be provided for the off-axis exposure. An advantage of a prism coupling technique is the fact that if incident light is detuned from reconstructing the holographic image of the object, it will be totally reflected from the interface between the prism and the air. Thus if there is a slight detuning then some light will be reflected from the holographic object and the remainder will be totally reflected. These two beams of light will then interfere, both with a small angular separation and both inclined at a small angle with respect to the surface. By varying the amount of detuning, the relative strength of the off-axis exposure can be adjusted with respect to that of the volume exposure.

In some embodiments a split-beam system can be advantageously used to record holographic images from a volume hologram. In a split-beam configuration, one beam is incident at the resonant angle onto the hologram of the object, and then reflected away from it. A second beam can then be brought in, by virtue of a second prism coupling, on the opposite side of the volume hologram, at a slightly off-axis angle from resonance. If both these beams use s-polarized light instead of the normal p-polarized light, then only the two beams progressing at a very small angle away from the hologram will interfere to produce the off-axis exposure needed for the opening set of fringes. The first beam that is incident onto the front side of the hologram before being reflected will not interfere with the second beam incident from the back side because their polarizations will be nearly orthogonal.

The above prism coupling procedures is similar to that described in the co-owned patents Nos. U.S. Pat. No. 6,608, 722 and U.S. Pat. No. 6,940,665, both entitled "Directional Diffuser", the contents of which are hereby incorporated by reference in their entireties. The directional diffuser described in the above issued patents pertains to producing shallow profiles so that broad band light is diffracted at an angle. The prism coupling procedure described in relation to surface relief volume structures produces deep structured profiles so that light is diffracted in single colors with full parallax (i.e., the color produced does not change if the hologram is tipped forward or backward or left or right, but rather stays constant regardless of how the angle of incidence varies or how the hologram is observed)

The systems, techniques and structures described herein apply not only to one-dimensional gratings, i.e., for surfaces defined as the x-y plane in which the step structure variation is only in a single direction (e.g., the x-direction) and is constant in another direction (e.g., the y-direction), but also apply to gratings that include variations in two or more directions (e.g., variations in both the x and y-directions). Such grating correspond, for example, to structures that may be produced through the introduction of a diffuse image that gives angular variation along both the x and y directions. A general result for the most extreme case is that the strong zero order resonance can remain strong while the adjacent orders (i.e., side lobes) can be reduced in intensity.

In one aspect, a surface relief structure is disclosed. The structure includes a recording medium configured to be structurally modified when exposed to interfering and non-interfering portions of radiation beams, the structurally modified recording medium includes, when viewed in a two-dimensional cross-section along one of the axes of the recording medium a plurality of equally spaced steps of fine-sized periodicity superimposed upon a plurality of deep depressions of substantially coarse-sized periodicity. The structurally modified recording medium is configured to produce in reflection single and multiple colors in a broad spectral range when illuminated by a source of light.

Embodiments of the structure may include one or more of the following features.

The radiation beams may include at least one of for example, light beams and/or electron beams.

The plurality of deep depressions of coarse-sized periodicity may include a grating structure varying along one direction in the two-dimensional cross-section view.

The period of the coarse-sized grating structure may be substantially symmetric when viewed in the two-dimensional cross-section view.

The period of the coarse-sized grating structure may be substantially asymmetric when viewed in the two-dimensional cross-section view.

The period of the coarse-sized grating structure may be skewed when viewed in a two-dimensional cross-section view relative to a principal surface of the recording medium prior to exposing the recording medium to portions of the radiation beams.

The plurality of equally spaced steps of fine-sized periodicity may be approximately half of a wavelength of illuminated light observed in reflection when the microstructure is coupled to an overcoating dielectric having an index of refraction approximately equal to 1.

The recording medium may be overcoated with a clear dielectric having an index of refraction, n, such that the illuminated light observed in reflection corresponds to a wavelength equaling to approximately twice the product of n and a height value of any of the equally spaced steps.

Light diffracted, upon illumination of the structure with a light source, may include light having wavelengths corresponding to predominantly a single color resonance whose bandwidth varies in inverse proportion to a number equaling the plurality of steps.

The plurality of deep depressions of coarse-sized periodicity may include a grating structure varying along in two directions of the two-dimensional cross-section view.

Light diffracted, upon illumination of the structure with a light source, may include multiple single-color resonances of near-equal intensities.

Light diffracted, upon illumination of the structure with a light source, may include a single color resonance that becomes narrower and bunched closer together such that it can fit under a broad spectral envelope as the number of steps increases.

Light diffracted, upon illumination of the structure with a light source, may include a single color resonance that is accompanied by several adjacent resonances of lower intensity such that a perceived single color is modified by the spectral composition of the adjacent colors.

Light diffracted, upon illumination of the structure with a light source, may include green and blue resonances that combine to produce light corresponding to the color cyan.

Light diffracted, upon illumination of the structure with a light source, may include green and red resonances that combine to produce light corresponding to the color yellow.

Light diffracted, upon illumination of the structure with a light source, may include blue and red resonances that combine to produce light corresponding to the color magenta.

Each of the plurality of deep depressions of coarse-sized periodicity may have a depth sufficient to diffract light that, in the absence of steps, would have a minimal diffraction efficiency.

The structure may further include a diffuse component such that parallax viewability is increased over a large horizontal and vertical range of angles.

In another aspect, a method for recording a holographic image of an object is disclosed. The method includes providing a recording medium configured to record a holographic image, the recording medium having two principal surfaces and placing the object proximate one of the two principal surfaces of the recording medium. The method also includes directing radiation beams at the other surface of the two principal surfaces of the recording medium at an angle with respect to a normal to the other of the two principal surfaces of the recording medium such that a resultant radiation beam reflected from the object interferes with a resultant first reference beam progressing in a direction that is at least partly similar to the progression direction of the radiation beam reflected from the object, both beams being separated by a small angle such that a first interference fringe structure is formed in the recording medium that is skewed at an angle with respect to any of the two principal surfaces of the recording medium, and such that a resultant second reference beam progresses in a general direction that is at least partly opposite to the direction of the radiation beams reflected from the object such that a fine-sized set of interference fringes is formed in the recording medium, the second set of interference fringe being skewed with respect to the any of the two principal surfaces of the recording medium.

Embodiments of the method may include any of the features described above in relation to the structure as well as one or more of the following features.

The first interference fringe structure may include at least one of, for example, an inclined first interference fringe structure and/or a non-symmetric first interference fringe structure.

Providing the recording medium may include providing a photoresist medium.

Placing the object may include encapsulating the object in an optically clear material, and placing the encapsulated object proximate the one of the two principal surfaces of the recording medium. Encapsulating the object in the optically clear material may include encapsulating the object in an optically clear cement index matched to a cover glass.

Placing the object may include placing a conventional volume hologram of a tangible object proximate the one of the two principal surfaces of the recording medium. The conventional volume hologram may be encapsulated between flat glass plates, and the conventional volume hologram may be recorded in one of, for example, dichromated gelatin (DCG), photopolymer and/or silver halide. Placing the conventional volume hologram may include placing the conventional volume hologram at an angle with respect to any of the two principal surfaces of the recording medium.

The method may further include reproducing holographic images of the object based, at least in part, on the first and second interference structures formed in the recording medium.

providing the recording medium may include providing a recording medium configured to be structurally modified when exposed to interfering and non-interfering portions of radiation beams, the structurally modified recording medium including, when viewed in a two-dimensional cross-section along one of the axes of the recording medium a plurality of equally spaced steps of fine-sized periodicity superimposed upon a plurality of deep depressions of substantially coarse-sized periodicity, the structurally modified recording medium is configured to produce in reflection single and multiple colors in a broad spectral range when illuminated by a source of light.

In a further aspect, a system to record a holographic image is disclosed. The system includes a recording medium having two principal surfaces and configured to record a holographic image of an object placed proximate one of the two principal surfaces of the recording medium, and a radiation source to direct radiation beams at the other surface of the two principal surface of the recording medium at an angle with respect to a normal to the other of the two principal surfaces of the recording medium such that a resultant radiation beam reflected from the object interferes with a resultant first reference beam progressing in a direction that at least partly is similar to the progression direction of the radiation beam reflected from the object, both beams being separated by a small angle such that a first interference fringe structure is formed in the recording medium that is inclined at an angle with respect to any of the two principal surfaces of the recording medium, and such that a resultant second reference beam progresses in a general direction that at least partly is opposite to the direction of the radiation beams reflected from the object such that a fine-sized set of interference fringes is formed in the recording medium, the second set of interference fringe being inclined with respect to the any of the two principal surfaces of the recording medium.

Embodiments of the system may include any of the features described above in relation to the structure and/or the method, as well as the following feature.

The radiation source may be a laser light source.

In yet another aspect, a method for recording a holographic image of an object is disclosed. The method includes providing a recording medium configured to record holographic image, the recording medium having two principal surfaces, placing the object proximate one of the two principal surfaces of the recording medium, and coupling a prism at a contact surface of the prism to the other of the two principal surfaces of the recording medium. The method also includes directing light beams at another surface of the prism such that a resultant radiation beam reflected from the object interferes with a resultant first reference beam progressing in a direction that is at least partly similar to the progression direction of the radiation beam reflected from the object, both beams being separated by a small angle such that a first interference fringe structure is formed in the recording medium that is skewed at an angle with respect to any of the two principal surfaces of the recording medium, and such that a resultant second reference beam progresses in a general direction that is at least partly opposite to the direction of the radiation beams reflected from the object such that a fine-sized set of interference fringes is formed in the recording medium, the second set of interference fringe being skewed with respect to the any of the two principal surfaces of the recording medium.

Embodiments of the method may include any of the features described above in relation to the structure, method and system, as well as one or more of the following features.

Coupling the prism may include coupling an equilateral prism having an index of refraction, n, of approximately 1.5, at a contact surface of the equilateral prism.

Coupling the prism may include placing an interfacing material between the coupling surface of the prism and the other of two principal surfaces of the recording medium. The interfacing material may include an index-matching liquid material that includes at least one of, for example, xylene, decalin and/or water.

Placing the object may include placing a conventional volume hologram of a tangible object proximate the one of the two principal surfaces of the recording medium. The method may further include coupling one surface of a glass plate to the one of the two principal surfaces of the recording medium, and coupling the conventional volume hologram to another surface of the glass plate using a material that includes gelatin.

The method may further include coupling a second prism to a back side of the volume hologram, and directing another radiation beam at the second prism such that the other radiation beam passes first through the second prism, the volume hologram, and the first prism to form an interference pattern with portions of the radiation beam that reflected from the object, wherein the radiation beam that reflected from the object and the other radiation beam progress, at least partly, in a similar direction.

In yet a further aspect, a system to record a holographic image is disclosed. The system includes a recording medium having two principal surfaces and configured to record a holographic image of a volume hologram of an object placed proximate one of the two principal surfaces of the recording medium and a prism coupled at a contact surface of the prism to the other of the two principal surfaces of the recording medium. The system also includes a light source to direct light beams at another surface of the prism such that such that a resultant radiation beam reflected from the object interferes with a resultant first reference beam progressing in a direction that is at least partly similar to the progression direction of the radiation beam reflected from the object, both beams being separated by a small angle such that a first interference fringe structure is formed in the recording medium that is inclined at an angle with respect to any of the two principal surfaces of the recording medium, and such that a resultant second reference beam progresses in a general direction that is at least partly opposite to the direction of the radiation beams reflected from the object such that a fine-sized set of interference fringes is formed in the recording medium, the second set of interference fringe being inclined with respect to the any of the two principal surfaces of the recording medium.

Embodiments of the system may include any one of the features described in relation to the structure, methods and system above.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Described herein is a surface relief volume reflective diffractive structure used, for example, to record holographic images. The structure includes a recording medium, for example, a photoresist-based medium, that is configured to be structurally modified when exposed to interfering and non-interfering portions of radiation beams. The structurally modified recording medium includes, when viewed in a two-dimensional cross-section along one of the axes of the recording medium a plurality of equally spaced steps of fine-sized periodicity superimposed upon a plurality of deep depressions of substantially coarse-sized periodicity (i.e., the period of the plurality of the deep depressions is larger as compared to the fine-sized periodicity of the steps in the depressions). The structurally modified recording medium is configured to produce single and multiple colors in a broad spectral range in reflection when illuminated by a source of light. That is, the resultant modified structure of the recording medium is such that when the structure is illuminated with a source of light, reflected light corresponding to a particular point of the reproduced image will appear as substantially a single color (that color being one from a wide spectrum of available colors that can be reproduced). In contrast, conventional surface relief structures produce images that include, at least partially, a rainbow of colors (i.e., a prism-like effect). Furthermore, conventional volume holograms produce images with colors drawn from a relatively narrow range of the color spectrum.

Figure 1:
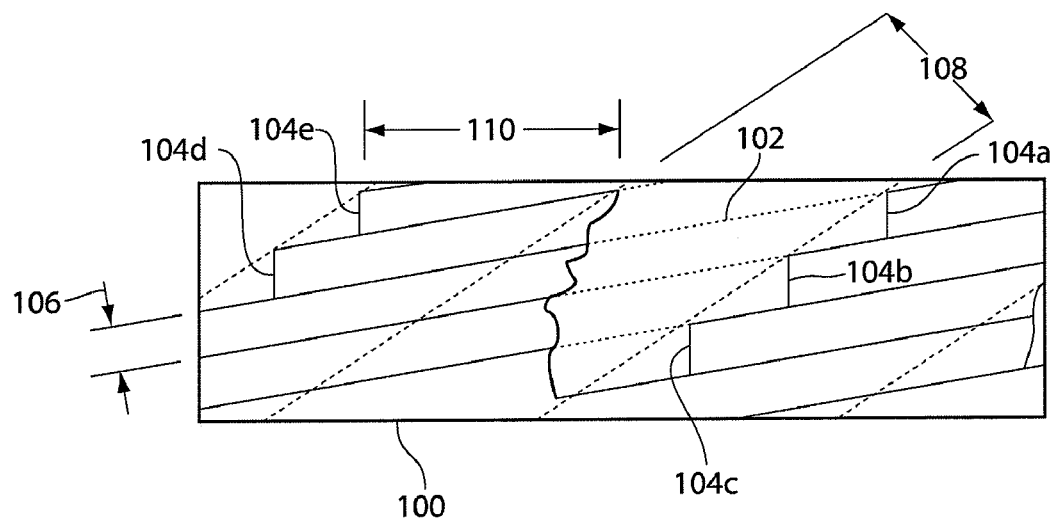
FIG. 1 is a partial two-dimensional cross-section view of an embodiment of a resultant surface relief structure.

Referring to FIG. 1, a partial two-dimensional cross-section view 100 of an embodiment of a resultant surface relief structure configured to produce single and multiple colors in a broad spectral range in reflection is shown. When viewed in cross-section, the surface relief structure includes a sequence of periodic deep depressions, such as deep depression 102, upon which equally spaced steps 104a-e, having a period 106, are superimposed. The steps are equally spaced in that they are of are of substantially equal height. As will become apparent below, the particular height of steps is related to the resonant wavelength that will be reflected from the formed structure when the structure is illuminated (e.g., the resonant wavelength is twice the step height times the index of refraction of the overcoating dielectric layer). In some embodiments, and as shown in FIG. 1, the deep depressions 102 are skewed relative to the edges of the two-dimensional cross-section view of the recording medium, and are thus skewed relative to the principal surfaces of the modifiable recording medium prior to the exposure of the recording medium to radiation beams (i.e., before the recording medium was etched), in that the orientation of the formed depressions is inclined. The deep depressions and steps superimposed thereon are gratings that cause reflected illumination to produce an image corresponding to the formed grating structure. As will be described in greater detail below, grating profiles that are skewed (e.g., inclined and/or non-symmetric) have a diffraction efficiency (i.e., spectral response) that is more concentrated near the resonant wavelength, thus resulting in apparent single color reflections (corresponding to a resonant reflection plus contributions from near-by side lobes corresponding to neighboring wavelength) when the structure is illuminated.

The deep depressions are also referred to off-axis opening fringe structures in that the openings (i.e., depressions) are inclined at angle relative to the normal axis of the cross-section view. As shown in FIG. 1, the sequence of deep-depressions has a period 108. As shown, the period 108 of the depressions 102 is generally larger than the period 106 of the steps 104 and thus, under these circumstances, the period 108 is referred to as having a coarse-sized periodicity in comparison to the fine-sized periodicity of the steps 104. In some embodiments the period of the deep depressions is ten (10) times, or more, larger than the periodicity of the steps (e.g., the depressions could have a period of 3.5-4 μm compared to the 200-400 nanometer periodicity of the steps). The period 108 of the deep depressions corresponds to off-perpendicular fringes that would be obtained in conventional surface relief structures. Projecting these off-perpendicular fringes onto the surfaces of the cross-section view 100 of the recording medium results in projections 110. As will further be discussed below, the procedures and systems for recording holographic images provide great leeway and flexibility in terms of the resultant surface structure. Resultant surface relief structures can thus have profiles ranging from nearly symmetrical configurations to asymmetric configurations. The variation between symmetric and asymmetric configurations determines, at least in part, the resultant spectrum of the diffracted light. Asymmetric structures cause a more defined color spectrum to be generated in reflection of the structure such that respective points of the reflected image will generally correspond to specific single color components rather than to a continuous rainbow of colors. Furthermore, skewing the grating of the structures formed in the recording medium also enables controlling the color spectrum of reflected light such that reflections from the gratings of the recording medium (or a replica thereof) are more defined and include apparent single color components from a wide spectrum of possible colors. As described herein, skewing of the grating refers to causing the resultant grating structure to be inclined with respect to the principal surfaces of the recording medium and/or causing the grating structure to have a non-symmetric configuration (i.e., a configuration that is not entirely symmetric, yet not entirely asymmetric, and in which the center point of the stepped pyramid, the apex, is displaced somewhat so that it does not occur exactly at the half-way point of the period of the grating profile).

Figure 2:
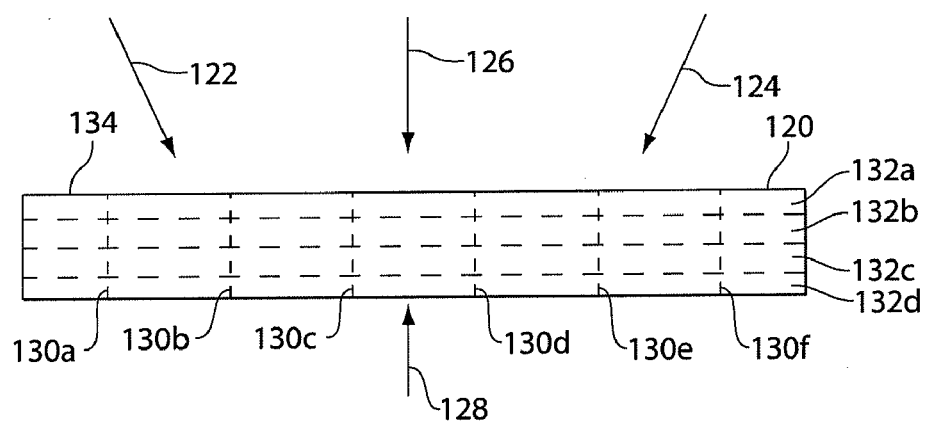
FIG. 2 is a schematic diagram illustrating a technique to form an Aztec diffraction grating.
Figure 3:
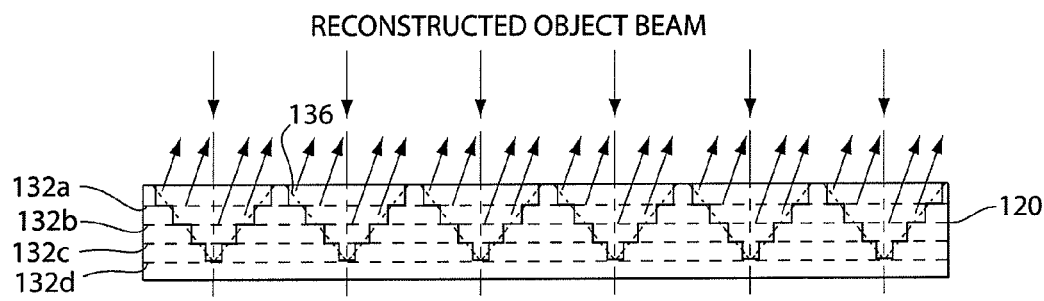
FIG. 3 is a partial cross-section view of an embodiment of a symmetric Aztec grating formed using the technique illustrated in FIG. 2.

In contrast to the skewed coarse-sized grating structure shown in FIG. 1, FIGS. 2 and 3 show a two-dimensional cross-section view of a non-skewed grating profile 120. FIGS. 2 and 3 also schematically illustrate the recording configuration used to form the interference fringes in the recording medium. Specifically, off-axis beams (e.g., laser beams) 122 and 124 interfere to produces the sets of interference fringes 130*a-f* which are predominantly perpendicular (normal) to the principal surfaces of the recording medium, such as a photoresist medium, prior to exposure of the recording medium to the radiation beams that modify the structure to form fringe patterns in the medium. Both the radiation beams 122 and 124 are incident from the same side of the medium onto the top edge 134 of the cross-section view 120 of the recording medium. These two beams thus enable the formation of the deep depressions in the recording medium corresponding to the interference fringe pattern. Two other radiation beams (e.g., also laser beams) 126 and 128, are incident on the recording medium from opposite sides of the principal surfaces of the recording medium, and incident at a perpendicular orientation to the surfaces, thus resulting in the interference fringes 132*a-d* which are substantially parallel to the principal surfaces of the recording medium (prior to its exposure to the radiation beams that thereafter cause modification to the structure of the recording medium).

With reference to FIG. 3, showing the etched cross-section view 120, the interfering patterns resulting from the off-axis radiation beams 122 and 124 include deep depressions having a general sine wave profile 136. As shown, the general sine wave profile 136 is modulated into a stepped profile, with the steps corresponding to the interference planes of the counter propagating radiation beams 126 and 128. The deep depressions formed by the off-axis radiation beams 122 and 124 enable the lower lying fringes, e.g., fringe 132*d*, to be accessed. Consequently, the resultant modified structure of the recording medium which includes the stepped deep depressions can be mechanically replicated. However, as noted above, when the recording medium modified so that it has non-skewed deep depression modulated by step is illuminated by light, the reflected light will generally be confined to a relatively narrow subset of the color spectrum. Additionally, the non-skewed grating pattern may give rise to multiple color reflections at some off-axis viewing angles.

Figure 4A:
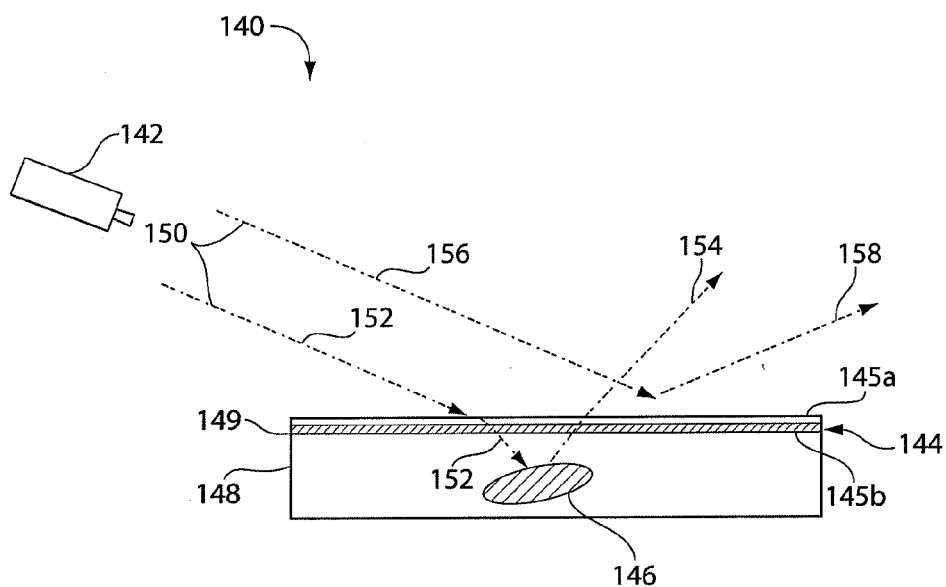
FIG. 4A is a schematic diagram of an exemplary system for recording holographic images.

Referring to FIG. 4A, a schematic diagram of a system 140 for recording holographic images by producing skewed fringe patterns in a surface relief structure such that the resultant structure can achieve single color reflections upon illumination of light on the recorded image is shown. The system 140 includes at least one radiation source 142 to produce radiation beams that are directed at the recording medium 144 (shown in cross-section for ease of explanation) that configured to be structurally modified when exposed to interfering and non-interfering portions of radiation beams. The recording medium 144 includes, in some embodiments, two principal surfaces, 145*a* and 145*b*. Radiation directed from the radiation source 142 is typically incident on one of the principal surfaces of the recording medium (the surface 145*a* in the illustration of FIG. 4). In some embodiments, the radiation beams include, for example, at least one of light beams, produced by a light source such as a laser source, and/or a source to produce electron beams. The nature and composition of the recording medium will depend on the radiation source used. For example, in circumstances in which light radiation is used to record holographic images, as described herein, the recording medium used is, for example, a photoresist recording medium (e.g., a positive photoresist that is etched when exposed to radiation). In some embodiments, a recording medium that responds to particle (e.g., electron) beam radiation may be used in circumstances where particle beams radiation is used by the recording system.

An object 146 whose image is to be holographically recorded is disposed proximate to another of the principal surfaces of the recording medium 144 (in this case, the principal surface 145*b*). In some embodiments, the object 146 may be encapsulated in a clear, index-matching material like optical cement 148 defining a contact surface 149 that interfaces with the principal surface 145*b* of the recording medium 144. In operation, the at least one radiation source 140 produces radiation beams 150 directed at the recording medium 144 from a direction that incident to the principal surface 145*a*. In some embodiments, the radiation beams are directed at an off-axis angle relative to the normal to the principal surface 145*a* of the recording medium 144 (e.g., an angle of more than 10° from the normal to the principal surface 145*a*).

The produced radiation beams 150 are incident, at the particular angle, on the recording medium 144. At least one portion of the radiation beams 150, namely the portion 152, passes through the recording medium 144 and through the encapsulate 148 and is reflected from the object 146 as radiation beam 154. At the same time, another portion 156 of the radiation beams 150 is reflected at the encapsulate-photoresist interface (i.e., at the point where the principal surface 145*b* and the contact surface 149 of the encapsulate 148 meet) as beam 158. Generally, the path taken by the beams (i.e., whether one portion will pass through the recording medium while another portion will reflect at the recording medium) depends on several factors, including the angle of incidence, the reflectance of the object, the polarization of the incident beam, the index of refraction of the cover glass and the underlying photoresist layer. For example, for light polarized parallel to the interface, the reflectance at the interface increases with angle of incidence, while for the opposite polarization, there is an angle, namely, the polarization angle, where the reflectance drops to zero. Thus, the ratio of light that is directed to the object or reflected at the recording medium can be varied, for example, by changing the state of polarization. Interference between the reflected radiation beams 150 and 154 (i.e., the beams incident from opposite sides of the recording medium 140) produce the so-called step fringes (e.g., similar to the step fringes 104*a-e* in FIG. 1) whereas the interference between the beams 154 and 158, which progress at least partly in a similar direction, produces the opening fringes (i.e., the deep depression such as depression 102 in FIG. 1). Upon exposure and development, a deep, stepped non-symmetric profile results. Thus, the system 140 is configured to direct radiation beams that produce off-axis reference beams that combine with a reflected object beam in such a way that at least one off-axis reference beam (e.g., beam 158) progresses, at least partly, in a similar direction as the object beam (e.g., the x and/or y direction orientation of the vector representation of the reference and object beams is the same) and such that at least one reference beam (e.g., beam 152) progresses in at least partly an opposite direction to the reflected object beam 154 (e.g., the x and/or y direction orientations of the vector representations of the reference and object beams are substantially opposite to each other). The interference of the various beams produces skewed (i.e., inclined and/or non-symmetric) interference fringe patterns (e.g., such as those shown in FIG. 1) that can produce substantially single color components from a broad spectral range in reflection when illuminated by a source of light. For example, if the incident light had wavelength 457 nm and was incident at a 60 degrees angle to the normal of the surface of the recording medium, then the angle of incidence of the radiation beam at the object would be 10.6 degrees (based on Snell's law and assuming a tilt angle of 10 degrees for the object, and an index of refraction for photoresist of n=1.7). Under these circumstances, the fringe spacing is d=457/(2.times.1.7.times. cos(20.7.degree.))=144 nm. If the recorded hologram on the recording medium were replicated and embossed into plastic having an index of refraction of n=1.5, and the hologram image was subsequently viewed through the plastic base, the observed color would have wavelength=432 nm, which is a blue-violet color. To access the rest of the visible spectrum a different recording geometry would have to be used.

Figure 4B:
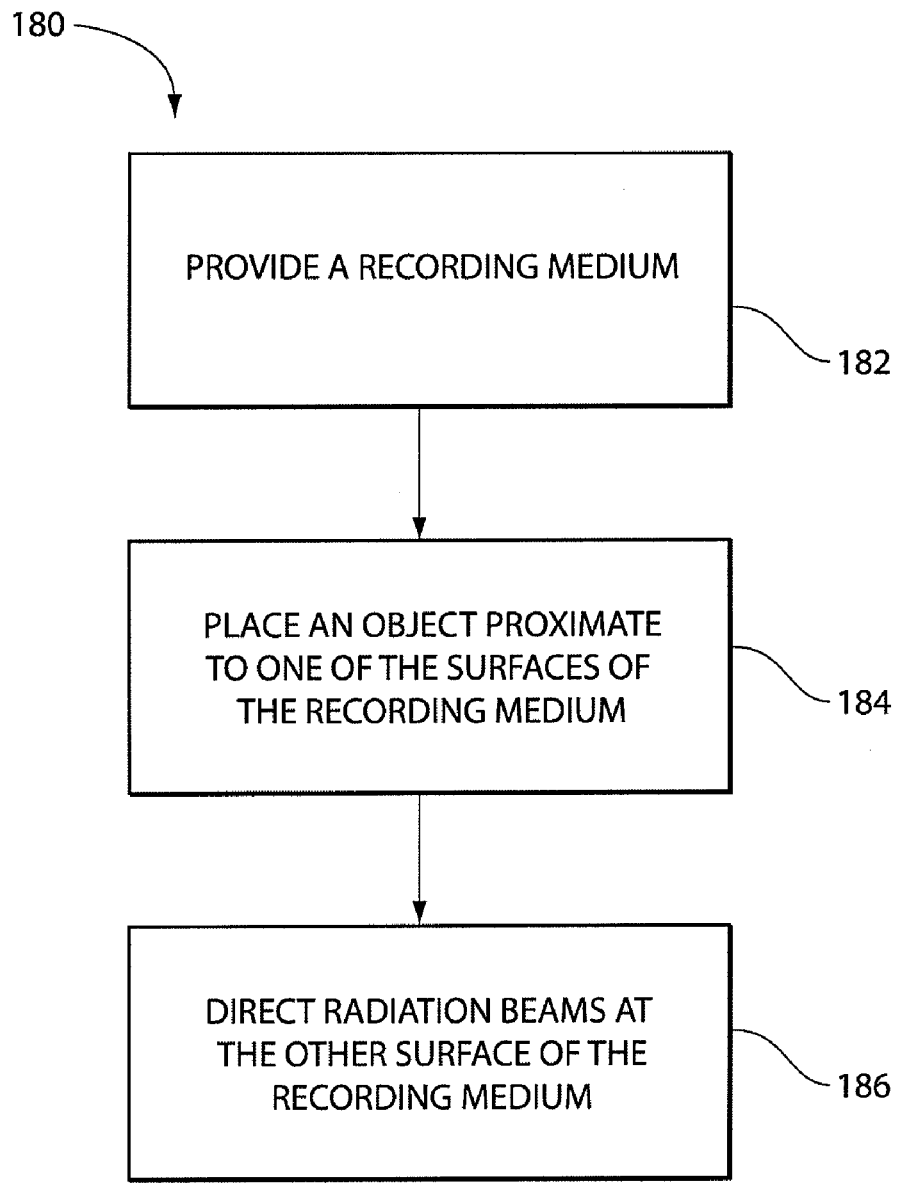
FIG. 4B is a flow diagram of an exemplary procedure to record holographic images.

Referring to FIG. 4B, a flow diagram of an exemplary procedure 180 to record holographic images is shown. Initially, a recording medium, such as, for example, the recording medium 144, is provided 182. The recording medium provided has, in some embodiments, two principal surfaces (e.g., 145a and 145b in the case of the recording medium 144) and is configured to record a holographic image. An object is placed 184 proximate to one of the two principal surfaces of the recording medium. For example, the object, whose image is to be holographically recorded is placed proximate to the surface 145b of the recording medium. Radiation beams (e.g., light beams) are then directed 186 at the other surface of the recording medium (i.e., the other surface that is not immediately next to the object whose image is to be recorded). The radiation beams can be directed from a light source positioned to illuminate radiation on the recording medium. The radiation beams are directed at an angle with respect to a normal to the other of the two principal surfaces of the recording medium such that a resultant radiation beam reflected from the object (e.g., like radiation beam 154 in FIG. 4A) interferes with a resultant first reference beam progressing in a direction that is at least partly similar to the progression direction of the radiation beam reflected from the object. The two interfering beams may be separated by a small angle such that a first interference fringe structure is formed in the recording medium that, for example, is inclined at an angle with respect to any of the two principal surfaces of the recording medium. Additionally, directing the radiation beams at the recording medium also results in a second reference beam that progresses in a general direction that is at least partly opposite to the direction of the radiation beams reflected from the object such that a fine-sized set of interference fringes is formed in the recording medium. That second set of interference fringe may also be, for example, inclined with respect to the any of the two principal surfaces of the recording medium. The resultant interference fringe patterns may also be non-symmetric.

Figure 5A:
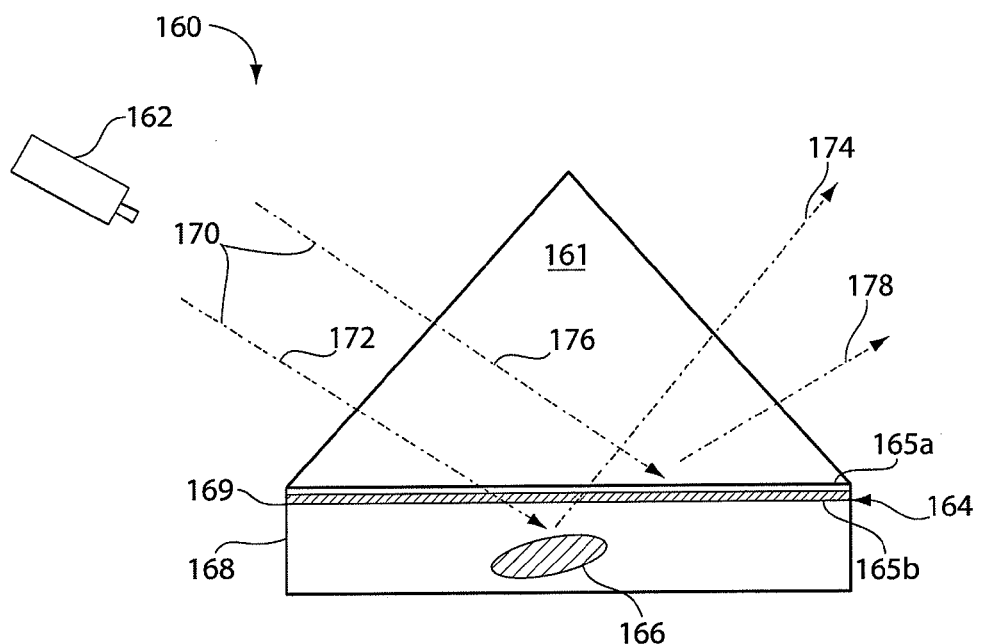
FIG. 5A is a schematic diagram of another exemplary embodiments of a recording system, with a prism, to record holographic images is shown.

Referring to FIG. 5A, a schematic diagram of an exemplary embodiments of an alternative recording system 160 to record holographic images is shown. The system 160 includes at least one radiation source 162. The radiation source 162 may be, for example, a light source illuminating light. The system 160 includes a recording medium 164 (which may be similar to the recording medium 144) and an object 166 that is disposed proximate to one of the principal surfaces of the recording medium 144 (namely, principal surface 165b). In some embodiments, the object 166 may be encapsulated in a clear, index-matching material like optical cement 168 defining a contact surface 169 that interfaces with the recording medium 164. As shown, the system 160 further includes an optical coupling device, such as a prism 161, that couples the illuminated source radiation onto the recording medium and the object (or encapsulated object). In some embodiments, a suitable optical coupling device is an equilateral prism having an index of refraction of n=1.5. The prism 161 is coupled to the recording medium using, for example, a closely index matching liquid. Examples of suitable coupling liquids that may be used include, for example, xylene (having an index of refraction n=1.49), decalin (n=1.48) and/or water (n=1.33).

As will be described below in greater detail, in some embodiments, the recording systems and procedures described herein can be used to record conventional volume hologram into a surface relief structure. Under those circumstances, to properly couple the recording medium 164 on which the prism 161 is disposed to such a volume hologram, the recording medium can be coupled to a separate thin glass plate (e.g., coating photoresist onto the separate thin glass plate) and the glass plate (not shown) can be coupled to the volume hologram using, for example, gelatin (e.g., a mixture that includes one part gelatin powder or crystal mixed with four parts water which is then allowed to swell, and is subsequently melted down at a temperature of around 60 degrees C.). When the gel is applied in the molten state, it will solidify at room temperature. After exposure of the recording medium the gelatin mixture layer can simply be stripped away, allowing the photoresist to be developed.

With continued reference to FIG. 5A, radiation beams 170 produced by the radiation source are directed at the prism 161 and are thus incident at a prism side at an incident angle of, for example, 60° relative to the normal to the principal surface 165a of the recording medium. The prism 161 causes a portion of the radiation 172 to be directed so that it passes the recording medium 164 and is reflected off the object 166. Another portion of the radiation beam 170, namely, portion 176, is reflected at the recording medium to result in a reflected reference beam 178. The ratio of the various radiation portions resulting from directing the radiation beam at the prism 161 will depend, at least in part, on the polarization state of the incident beam. Thus, the configuration of the system 160 shown in FIG. 5 results in an object radiation beam reflected from the object 166, a reference beam 176 that progresses, at least partly, in a direction substantially opposite the direction of progression of the object radiation beam 174 (e.g., the x and/or y direction orientations of the vector representations of the reference and object beams are substantially opposite to each other), and a second reference beam 178 progression in a direction that is at least partly similar (within a small angle separation) to the progression direction of the object radiation beam 174 (e.g., the x and/or y direction orientation of the vector representation of the reference and object beams is the same). The reflected object beam 174 interferes with the reflected reference beam 178 to form a deep depression fringe pattern (similar to the fringe pattern that includes the deep depression 102 of FIG. 1). That pattern is generally skewed (non-symmetric and/or inclined) relative to the principal surfaces of the recording medium (prior to exposure of the recording medium to radiation beams). The reflected object radiation beam 174 also interferes with the reference radiation beam 176 to form skewed step fringes (similar to the steps 104a-e shown in FIG. 1).

As an illustrating example of the fringe structure that results from recording a holographic image using a prism as described in relation to FIG. 5A, source radiation is directed at a prism coupled to a photoresist recording medium in a manner similar to that shown in FIG. 5A. The angle of incidence of the source radiation is 60 degrees and the object is tilted at 10 degrees (similar to the setup for the example used in relation to FIG. 4). When a prism is used in the recording procedure, we obtain fringe spacing of d=457/(2×1.7×cos 50°)=209 nm. The observable wavelength at normal incidence through an embossed plastic base would then be (209×2×1.5)=627 nm, corresponding to a red color. Thus, use of prism coupling therefore enables access to a more complete set of the visible spectrum than was possible using, for example, the system 140 shown in FIG. 4.

Figure 5B:
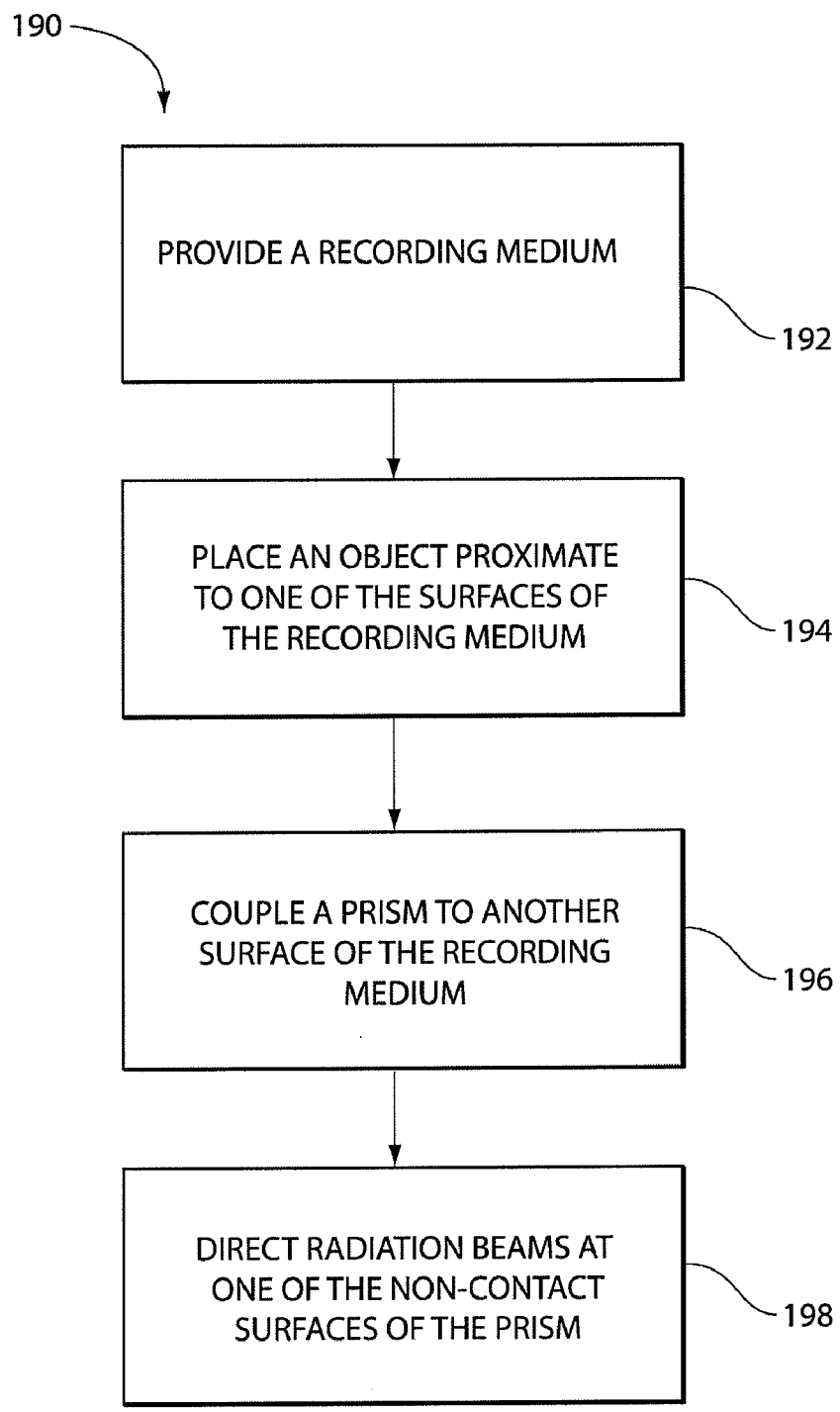
FIG. 5B is a flow diagram of an exemplary procedure to record holographic images.

Referring to FIG. 5B, a flow diagram of an exemplary procedure 190 to record holographic images is shown. Initially, a recording medium, such as, for example, the recording medium 164, is provided 192. The recording medium provided has two principal surfaces (e.g., 165a and 165b in the case of the recording medium 164) and is configured to record a holographic image. An object is placed 194 proximate to one of the two principal surfaces of the recording medium. For example, the object, whose image is to be holographically recorded is placed proximate to the surface 165b of the recording medium. A prism (e.g., an equilateral prism) is coupled 196 at the contact surface of the prism to the other principal surface of the recording medium. Radiation beams (e.g., light beams) are then directed 198 at another surface of the prism (i.e., a surface not coupled to the recording medium). The radiation beams can be directed from a light source positioned to illuminate radiation on the recording medium. The radiation beams are directed such that a resultant radiation beam reflected from the object (e.g., like radiation beam 174 in FIG. 5A) interferes with a resultant first reference beam progressing in a direction that is at least partly similar to the progression direction of the radiation beam reflected from the object. The two interfering beams may be separated by a small angle such that a first interference fringe structure is formed in the recording medium that is inclined at an angle with respect to any of the two principal surfaces of the recording medium that interfering pattern may also be non-symmetric. Additionally, directing the radiation beams at the recording medium also results in a second reference beam that progresses in a general direction that is at least partly opposite to the direction of the radiation beams reflected from the object such that a fine-sized set of interference fringes is formed in the recording medium. That second set of interference fringe may also be inclined with respect to the any of the two principal surfaces of the recording medium.

Figure 6A:
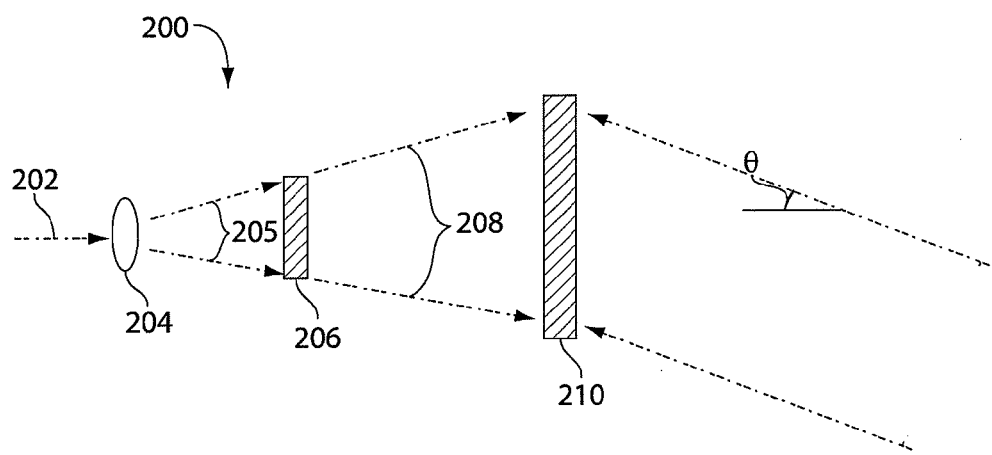
FIG. 6A is a schematic diagram of apparatus for producing a volume hologram of a diffuser.

In some embodiments, recording of a holographic image is performed by placing a conventional volume hologram of an object proximate to one of the principal surfaces of the recording medium instead of placing the actual object proximate the recording medium. In other words, in such embodiments, the procedure for recording holographic images of an object includes an initial recording of a conventional volume hologram of the object, and then using the recorded volume hologram to produce a surface relief structure using a system such as, for example, system 140 or 160, and performing the operations required to produce holographic images using those system configurations. Referring to FIG. 6A, a typical holographic apparatus 200 for producing a volume hologram of a diffuser is shown. A radiation beam, such as laser beam 202, is incident on expansion lens 204. The resultant expanded beam 205 impinges on a diffuser plate 206. In some embodiments, the diffuser plate 206 could be, for example, a ground glass plate. A diffuse beam 208 expands further until it is incident on the recording volume hologram plate 210. The hologram material could be, for example, dichromated gelatin (DCG), photopolymer and/or silver halide.

Figure 6B:
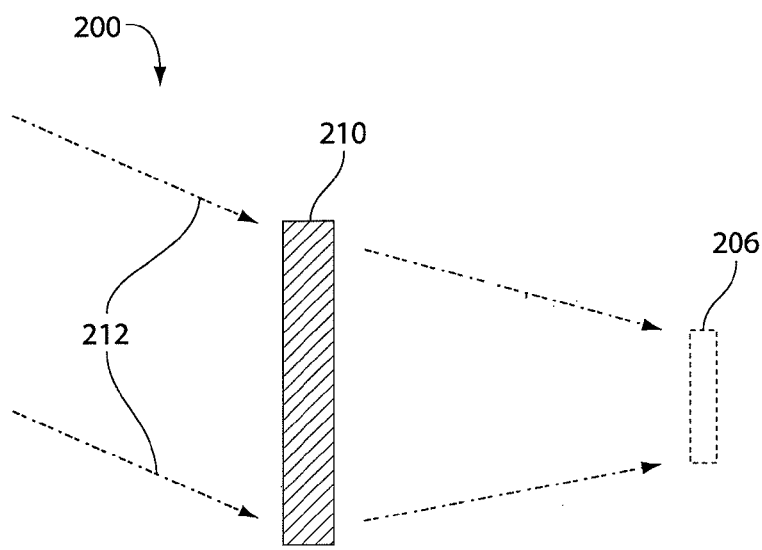
FIG. 6B is a schematic diagram of another configuration of the exemplary embodiment of the apparatus of FIG. 6A.

An exposed and developed hologram recording, for example, a recording of an object performed on a plate of DCG can subsequently be used to record a holographic image of the object on a surface relief structure (which can subsequently be mechanically replicated) instead of using the actual object to record the holographic image. Additionally and/or alternatively, the resultant conventional volume hologram can be further processed. Referring to FIG. 6B, a schematic diagram of an exemplary embodiment of another mode of operation for the apparatus 200 of FIG. 6A is shown. Particularly, the radiation paths defined by the radiation beams 212 (in this case, the radiation beams are light beams) are directed at the volume hologram plate 210. The incident light beams thus cause a second focused image of the hologram image recorded on the volume hologram to form on the diffuser plate 206 (the focused image is represented as the dotted image on the diffuser plate 206). In circumstances in which the volume hologram plate is based on DCG material, blue light recorded on the DCG plate can be swelled chemically (e.g., subjecting the plate to a series of water and alcohol baths at different temperatures and by immersion is a chemical called triethanolamine (TEA), such that the fringe spacing is enlarged to thus enable reconstruction of the image with red or green light instead of blue.

Figure 7:
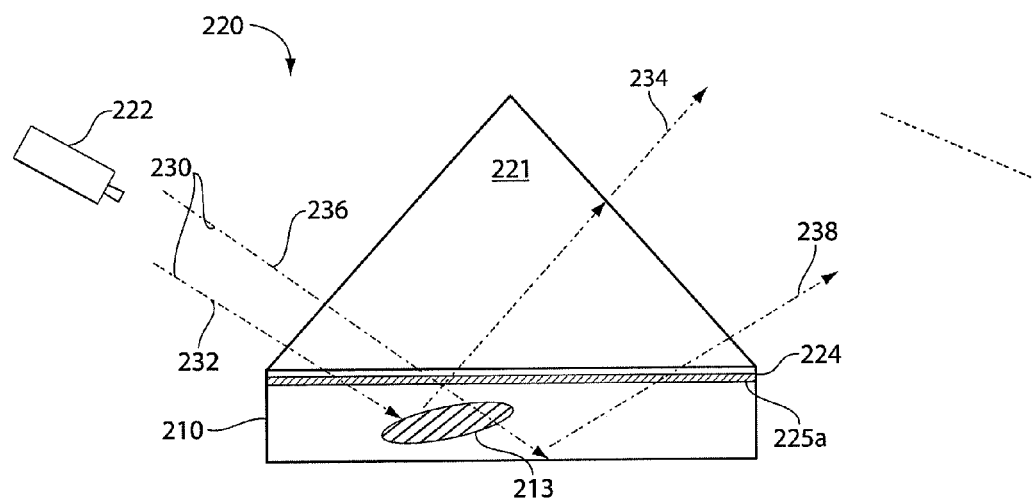
FIG. 7 is a schematic diagram of an exemplary embodiment of a holographic recording system coupled to a volume hologram.

Once a conventional volume hologram has been prepared, the processed volume hologram plate 210 with a holographic recorded image of an object can thus be coupled to the prism in a manner similar to that performed in relation to the coupling of the encapsulated object 166 to the prism 161 in FIG. 5. Referring to FIG. 7, a schematic diagram of an exemplary embodiment of a holographic recording system 220 is shown. As in the system 160 shown in FIG. 5, the system 220 includes a radiation source, such as light source 222, that directs light incident, at an angle, at a side of a prism 221 (e.g., an equilateral prism). The prism 221 is coupled to a recording medium 224, such as a photoresist medium, configured to be structurally modified when exposed to interfering and/or non-interfering radiation beams. The light source 220, the prism 221 and the recording medium 224 may be similar to the light source 160, the prism 161 and the recording medium 164 described in relation to the system 160 of FIG. 5. Coupled to a principal surface 225a of the recording medium 224 is the volume hologram plate 210 describe in relation to FIGS. 6A and 6B. Recorded on the hologram plate 210 is a holographic image 213 corresponding to some tangible object previously holographically recorded on the plate 210. As shown, the recorded image was recorded with a built-in tilt angle.

An advantage of using a volume hologram to record holographic images on a surface relief structure instead of using the actual object is that the recorded holographic image of the volume hologram can be focused to be flat in an image plane and yet still be reconstructed at an angle without distorting the image. That is, to an observer observing, for example, a holographic image at a common viewing angle, e.g., 20 degrees, the image will appear flat and undistorted even though the image is being viewed at an angle. Moreover, because of the transparency of narrow-band volume holograms to off-axis light, the use of a volume hologram to record holographic images on a surface relief structure provides more flexibility in terms of the amount of light that is distributed between the off-axis exposure and the volume step structure exposure. Specifically, if the volume hologram is recorded, developed, and processed such that it is nearly monochromatic with a narrow band single color, then the reconstruction efficiency becomes sensitive to variations in the angle of incidence of the reference beam onto the hologram. If the angle is exactly at resonance, then the hologram will reconstruct with high efficiency. A slight angular variation off the resonance will generally result in almost no reconstructed light, and the reference beam will almost entirely be transmitted through the hologram plate. Because with prism coupling the angle of incidence is beyond the critical angle for total reflection (given as sin(θ)=1/n, where n=index of refraction; if n of the prism=1.5, the critical angle of total reflection is θ=41.8 degrees), this beam will be totally reflected at the prism-air interface. Accordingly, through careful adjustment of this angle, the amount of light totally reflected can be changed from nearly zero to some non-zero value. For the on-resonance condition, most of the reflected light is from the object and thus the step structure fringe formation is maximized through the interference of beams 230 and 234. If the angle is slightly off-resonance, then more light is totally reflected as beam 238 interferes with the object light 234 to form the off-axis fringes. Exposure can be varied between these two conditions to maximize the resultant effect on the eventual etched groove profile in photoresist.

The production of more than one color can be done by recording multicolor volume holograms. One technique that can be used to implement the recording of multicolor volume holograms is to stack together separate plates corresponding to different colors.

Figure 8A:
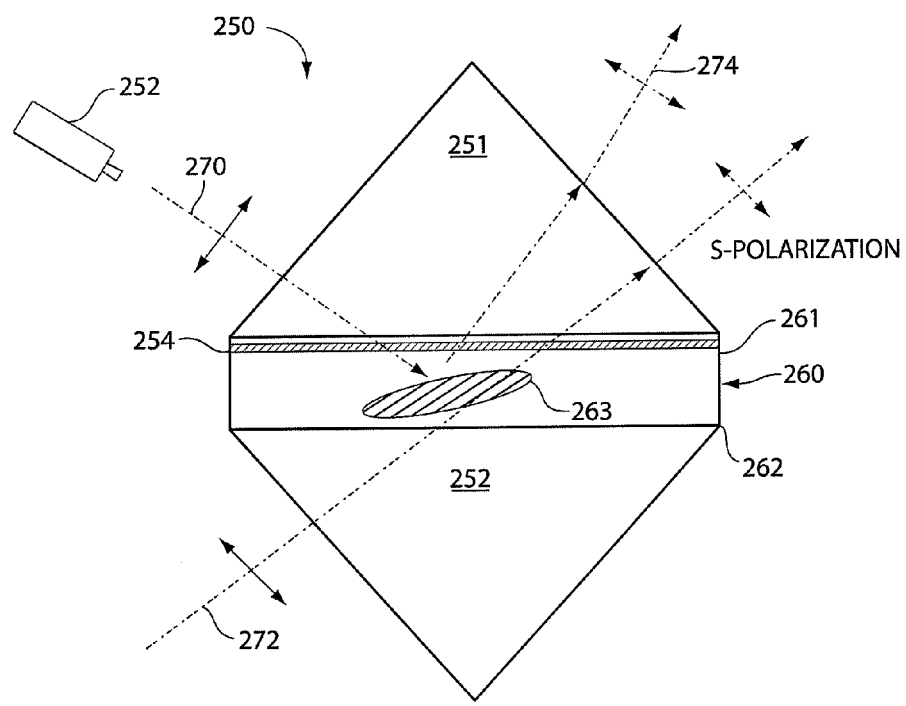
FIG. 8A is a schematic diagram of another exemplary embodiment of a hologram recording system that uses S-Polarized incident light and dual prism coupling.
Figure 8B:
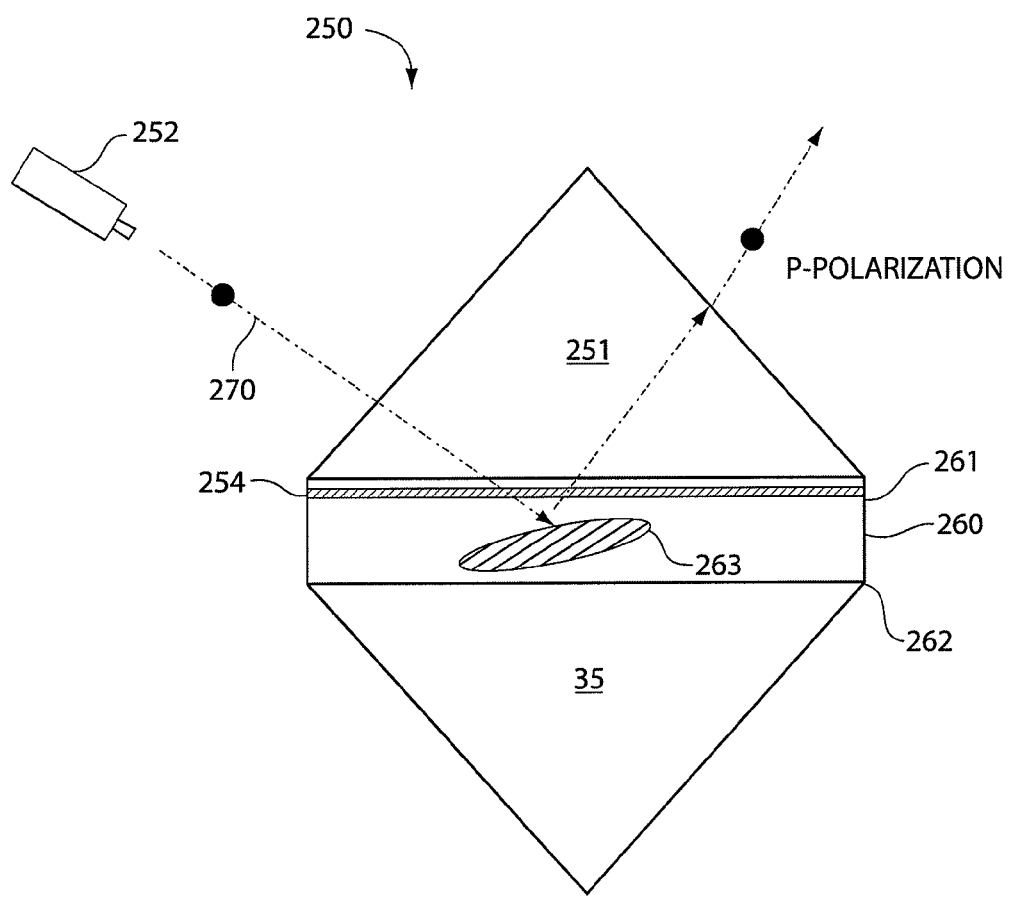
FIG. 8B is a schematic diagram of another exemplary embodiment of a hologram recording system that uses P-Polarized incident light for fine fringe structure formation.

Referring to FIG. 8A, a schematic diagram of another exemplary embodiment of a hologram recording system 250 is shown. The system 250 is based on a two prism and a split beam configuration. The configuration of the system 250 takes into account the polarization of the beams. A volume hologram plate 260 (which may be similar to the plate 210 described in relation to FIGS. 6 and 7) is positioned so that it is coupled to a recording medium 254 such as a photoresist medium configured to be structurally modified when exposed to interfering and/or non-interfering radiation beams at a surface 261 of the plate 260. The recording medium 254 is coupled to a prism 251 which may be similar to the prisms previously described in relation to FIGS. 5 and 7. The system 250 includes an additional second prism 252, which may also be an equilateral prism, that is coupled to the back side of the hologram plate 260, namely, at the surface 262 of the plate 260. The incident beam 270 generated by the radiation source 252 is split such that one portion of the split beam is incident on the hologram plate to illuminates the recorded holographic image 263 recorded on the plate 260. The second split beam 272 is brought into the second prism 252 from a beam splitter (not shown) between the incident laser beam and the two prisms. Generally, one of the beams from the beam splitter proceeds to the first prism while the other beam from the beam splitter goes to the second prism. The second split beam 272 passes through the prism 252 at an off-resonant angle to interfere with reflected beam 274 to form the off-axis fringes. This is done with s-polarized light (i.e., E-vector lying in a plane normal to the optical table, as shown). This light is used substantially entirely to form the off-axis fringes, because beams 270 and 272, as well as beams 270 and 274 interfere only minimally as a result of their E-vectors being approximately orthogonal. With reference to FIG. 8B, if the split beam can be adjusted so that all the light goes into beam 270 at the resonant angle and the polarization is changed to p-polarization (E-vector parallel to the photoresist interface), then formation of the step fringes is maximized by interference between beams 270 and 274.

It should be noted that in the above recording systems and methods, the photoresist should be in close contact with either the actual object or a hologram of the object. This is because the fringe structure is so fine (of submicron dimensions), that any movement has a deleterious effect on the fidelity of the fringes. Typical volume holograms avoid this because they include multiple layers. Even though each layer may diffract with a small efficiency, the overall effect is to produce a bright result through the additive effect of the many layers. With Aztec structures, on the other hand, there is really only one stepped layer, so its fidelity has to be good to achieve high efficiency.

To investigate the performance of surface relief structures such as those described herein, a computer application program GSolver™, provided by the Grating Solver Corporation, was used to compute the diffraction efficiency achieved with several surface relief grating structures. The GSolver™ enables special geometries to be considered, such as partial, skewed (including inclined and/or non-symmetric geometries), symmetric and asymmetric profiles. The application computes the diffraction efficiency corresponding to those geometries. For the purpose of the analysis provided herein, several grating configuration/geometries were considered, including fully symmetrical and fully asymmetrical grating geometries. The gratings profiles considered corresponded to surface relief structures having step heights and dielectric overcoatings that provide viewability in the visible spectral range. Such grating profiles may be produced using the recording systems described, for example, in relation to FIGS. 4, 5, 7 and 8.

Figure 9A:
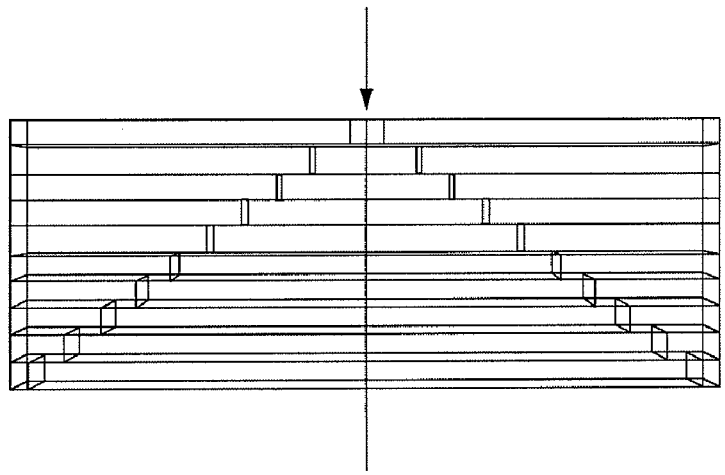
FIG. 9A is a groove profile of a ten step symmetric Aztec grating.
Figure 9B:
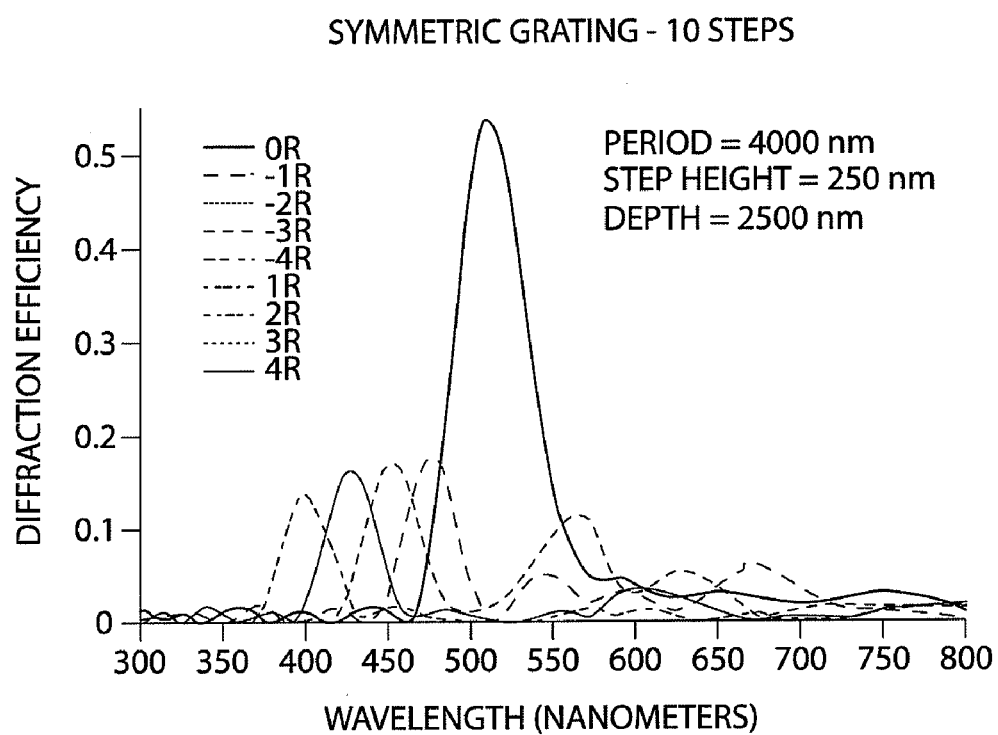
FIG. 9B is a graph of the diffraction efficiency versus the wavelength for the grating of 9A.

Referring to FIGS. 9A and 9B, a partial cross-section view of a symmetric grating profile 300 and a diffraction efficiency graph 310 are respectively shown. The grating profile 300 is a simplified ten level symmetrical grating structure. FIG. 9B shows the results of the full vector diffraction efficiency computations as a function of wavelength from 300 to 800 nanometers, using a grating period of four micrometers (4 µm) and a step height of 250 nanometers. For the purpose of the analysis and computation, the steps of the structure were assumed to be steps coated with an opaque aluminum layer, and the assumed overcoating dielectric used was air having an index of refraction of n=1.0. As shown in FIG. 9B, resonance for the grating profile 300 occurs at a wavelength 500 nanometers, which corresponds to twice the step height. In addition, as can be seen, there are multiple subsidiary spectra (side lobes) at wavelengths adjacent to the resonant wavelength, but at substantially lower efficiencies.

Figure 10A:
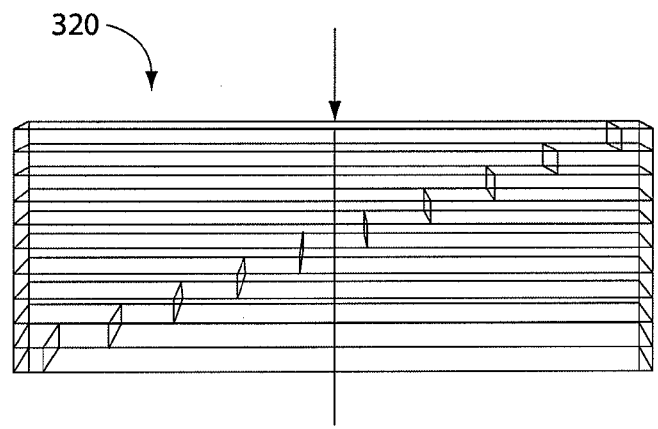
FIG. 10A is a groove profile of a ten step asymmetric Aztec grating.
Figure 10B:
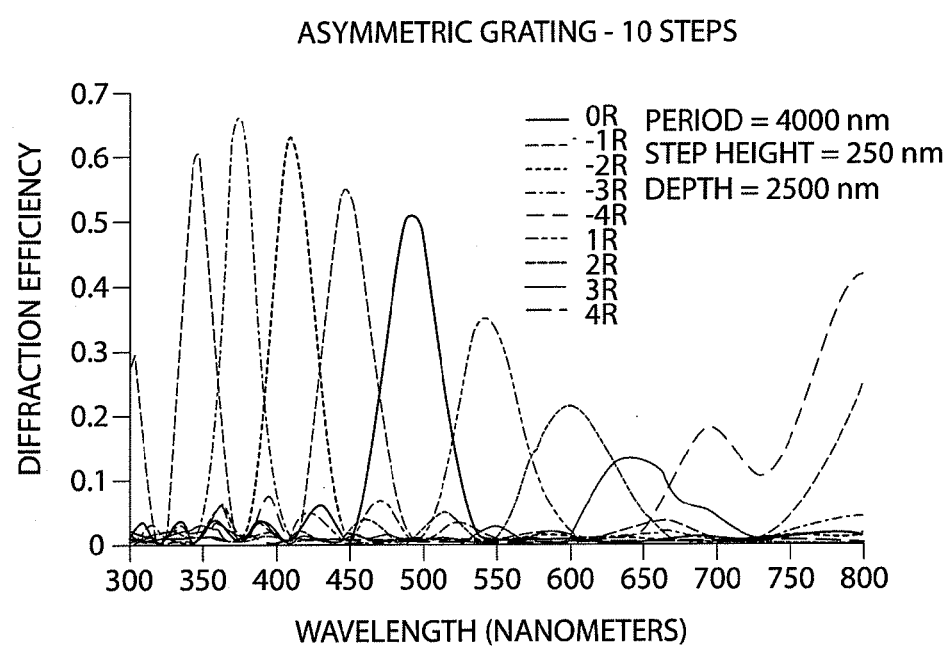
FIG. 10B is a graph of the diffraction efficiency versus the wavelength for the grating of FIG. 10A.

Referring to FIG. 10A, an asymmetric ten level grating profile 320 is shown. As with the grating profile 300 shown in 9A, the grating profile 320 has steps having a height of 250 nanometers and are coated with an opaque aluminum layer. The overcoating dielectric used was again air having an index of refraction of n=1.0. FIG. 10B shows the results of the diffraction efficiency computation as a function of the wavelength (for a wavelength range of 300 to 800 nanometers). The use of steps with a height of 250 nanometers once again results in a resonance wavelength of 500 nanometers for the grating profile 320. On the other hand, as shown in the graph of FIG. 10B, the subsidiary spectra, which previously had low efficiency values (indicating that other wavelength are greatly attenuated or suppressed for the profile 300) now include wavelengths corresponding to high diffraction efficiency, thus indicating that for the grating profile 320, multiple colors would be viewed in reflection when that structure is illuminated. In fact, the whole spectral range could fit under an envelope that is typical of a shallow blazed sawtooth grating.

Figure 11A:
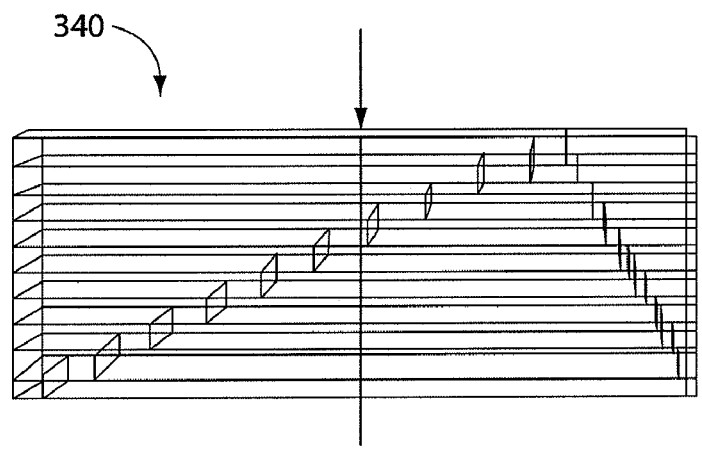
FIG. 11A is a groove profile of a ten step skewed grating.
Figure 11B:
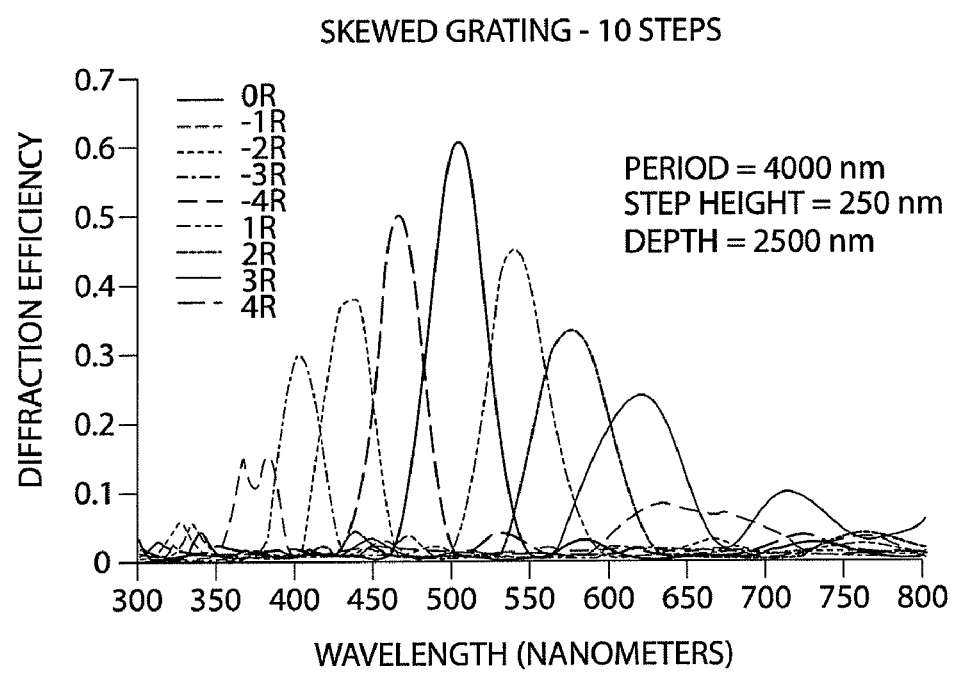
FIG. 11B is a graph of the diffraction efficiency versus the wavelength for the grating of 11A, with the grating having a period of 4 microns and a step height of 250 nanometers.

Referring to FIG. 11A, a surface relief structure profile 340 for a ten level, nearly asymmetric Aztec grating is shown. In the Grating Solver program, this profile is specified as a skewed non-symmetric profile, where the center point at the top is displaced from the 0.5 center point of the period to 0.75 of the period. As with the grating profiles 300 and 320 of FIGS. 9A and 10A, the grating profile 340 has step height of 250 nanometers. As described herein, skewed gratings, in which the stepped and deep depression fringes formed in the surface relief structure are skewed relative to principal surfaces of the recording medium, can be produced using the systems and procedures described, for example, in relation to FIGS. 4, 5, 7 and 8. As also described herein, skewing the grating profile can also be achieved by causing the profile to be inclined at an angle relative to the principal surfaces of the recording medium. FIG. 11B shows the spectral responses, expressed as the diffraction efficiency for a wavelengths range of 300-800 nanometers. As shown, resonance for the grating profile 340 once again occurs at 500 nanometers. However, unlike the spectral response for the grating profile 320, as shown in FIG. 10B, in this case the diffraction efficiency of spectra adjacent to the resonant wavelength is attenuated and bunched closer to the resonance. Thus, the spectral response for the structure 340, having the skewed grating profile, is such that it has an apparent single color at the 500 nanometers resonance wavelength. Although the spectral response shown in FIG. 11B is not one that corresponds to a pure narrow-band color, the side lobes adjacent to the resonant wavelength are substantially centered at the 500 nanometer wavelength that any rainbow effect when the reflection from a physical structure having a grating profile similar to that of the grating profile 340 would be reduced as compared, for example, to the grating profile 320 of FIG. 10A. As also seen, the side lobes of the resonant wavelength corresponding to the −1 to −4 spectra (i.e., the lobes corresponding to wavelength from 350 nanometers to around 470 nanometer) have higher spectral contributions (i.e., higher diffraction efficiency) than the side lobes corresponding to the wavelengths 530-730 nanometer. These higher contributions from the negative side lobes, along with the contribution from zero order lobe (i.e., the resonant wavelength) constitute a blue and green combination, which means that the apparent color observed in reflection is closer to cyan color than to green. Because more colors are taken out of the spectrum with respect to a single narrow-band color, the brightness would be significantly greater. Furthermore, the focus of the resultant image would still be retained because that focus depends on the narrow band behavior of each single wavelength in the cluster. Furthermore, if the spectral scan refers to an actual holographic image, the negative side lobes in the spectral response, along with the zero-order, are all part of the real image, while the positive orders would correspond to the pseudoscopic image (i.e., an image turned inside out).

Figure 11C:
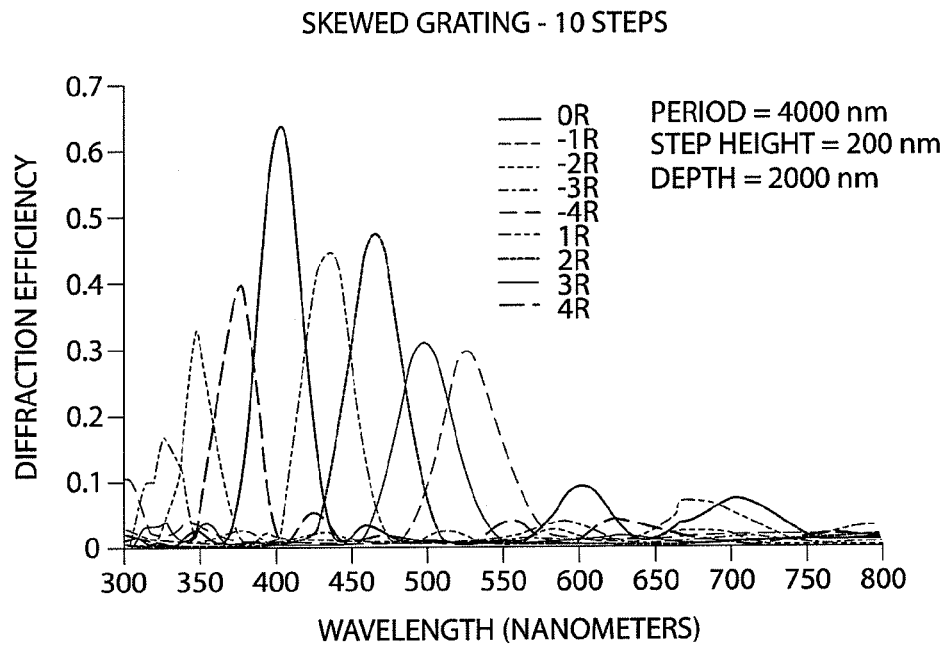
FIG. 11C is a graph of the diffraction efficiency versus the wavelength for the grating of FIG. 11A, with the grating having a period of 4 microns and a step height of 200 nanometers.
Figure 11D:
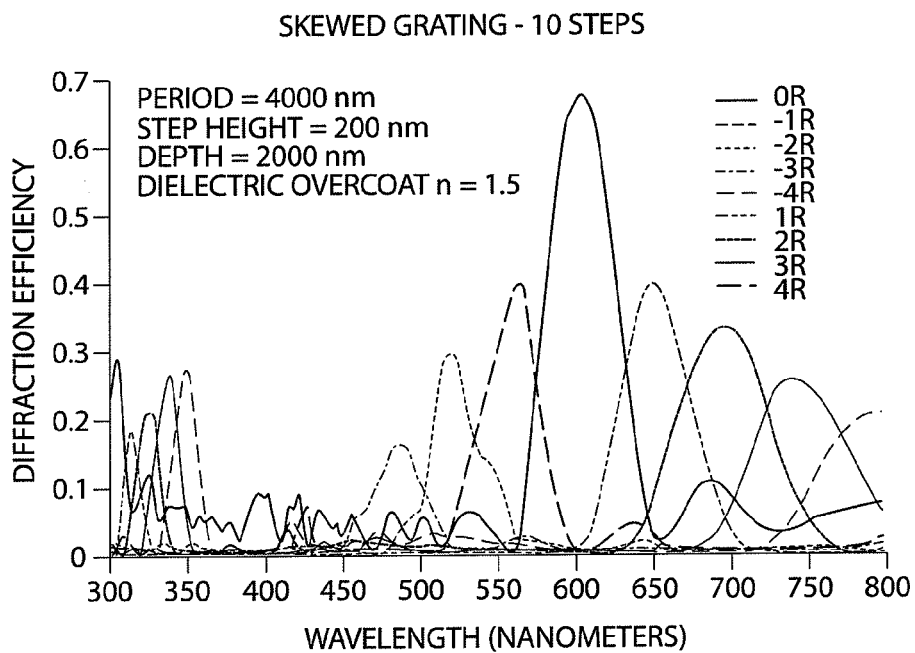
FIG. 11D is a graph of the diffraction efficiency versus the wavelength for the grating of FIG. 11A, with the grating having a period of 4 microns and a step height of 200 nanometers and with the grating having been overcoated with a clear dielectric having an index of refraction of n=1.5.

FIG. 11C shows the results of the diffraction efficiency computations for the grating profile shown in FIG. 11B when the step height for the grating profile 340 has been changed from 250 nanometer to 200 nanometers. Because the resonance of the stepped pyramid structures depends on the step height (for a dielectric with an index of refraction of n=1, it is twice the step height), as expected, the resonance in the graph of FIG. 11C appears at 400 nanometers. As further shown in the graph of FIG. 11C, in addition to the resonance lobe there are multiple adjacent side lobes that contribute to the overall brightness in a manner similar to that described in relation to FIG. 11B. Thus, for the modified structure corresponding to graph of FIG. 11C, an overall spectral shift from the green part of the spectrum (at 500 nanometers) to the blue part of the spectrum at approximately 400 nanometers is evident. FIG. 11D shows the results of the diffraction efficiency computations for a grating profile that has 200 nanometer steps coated with a clear dielectric having an index of refraction of n=1.5. This type of a grating profile could be obtained, for example, by embossing a surface relief structure with 200 nanometer step height pattern (formed, for example, through one or more of the procedures described herein in relation to FIGS. 4, 5, 7 And/or 8) into a plastic base having an index of n=1.5. As shown in FIG. 11D, the diffraction efficiency spectral response is shifted to approximately the theoretical resonant wavelength of 600 nm (computed as $\lambda_{resonant}=2nh$, which in this case is equal to 2×200 nm×1.5=600 nm). Similar to the spectral response shown in FIGS. 11B-C, the central resonance lobe is accompanied by several closely bunched side lobes having slightly less intensity, but which nevertheless contribute to the overall color effect to produce an apparent single color. In this particular case the spectral response includes a resonant wavelength located at the red end of the visual spectrum with contributions from the green part of the spectrum. Thus, the apparent color produced is closer to orange color than to red.

Figure 12A:
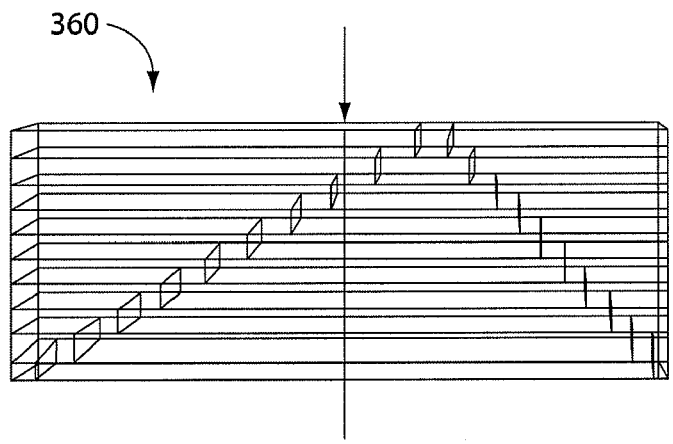
FIG. 12A is a groove profile of a ten step skewed grating, where the top step is shifted to a position 0.65 of the period.
Figure 12B:
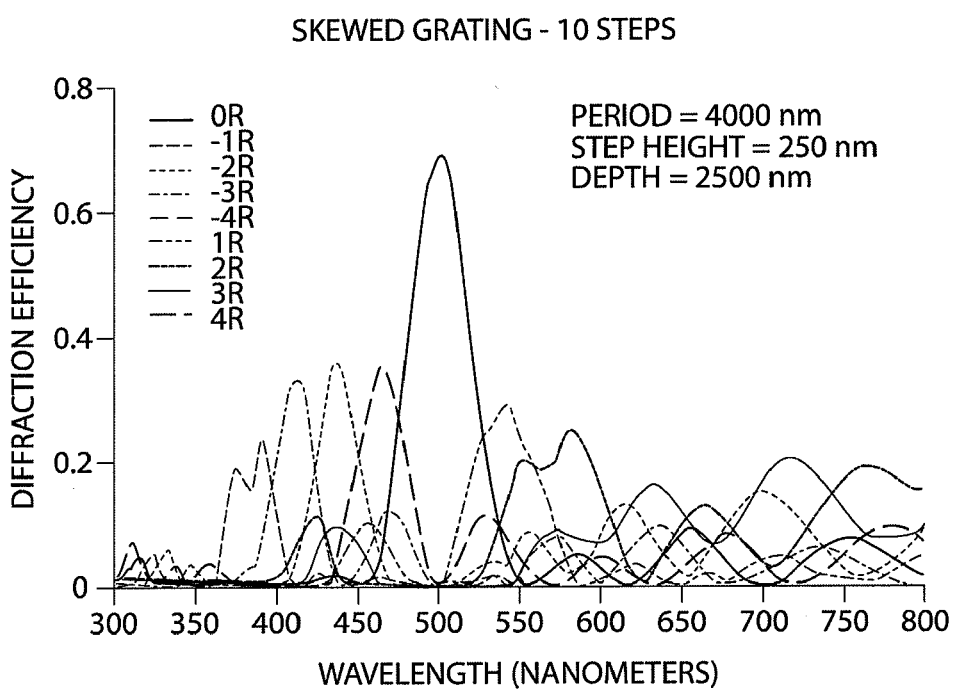
FIG. 12B is a graph of the diffraction efficiency versus the wavelength for the grating of 12A, with the grating having a period of 4 microns and a step height of 250 nanometers.

Referring to FIG. 12A, a grating profile 360 having a slightly less skewed profile than the surface relief structure of FIG. 11A is shown. The surface relief structure profile has a step height of 250 nanometers and the dielectric interface for the surface relief structure is air (i.e., n=1). The center point of the grating profile 360 is displaced from being at 0.5 of the period to 0.65 of the period. FIG. 12B shows the results of the diffraction efficiency computations for the surface relief grating profile of FIG. 12A. As shown, the spectral response for the grating profile 360 is similar to the spectral response for the for the grating profile 300 of FIG. 9A (i.e., the total symmetric grating profile) except that that the spectral response for grating profile 360 exhibits an increase in the diffraction efficiency of the side lobes adjacent to the center resonance of 500 nanometers. These adjacent lobes (corresponding to particular colors) cause a much brighter and apparent single color, centered at 500 nanometers (although less pure in terms of color composition in comparison to, for example, symmetric grating profiles). The combination of colors from green to blue means that the apparent single color is closer to cyan than to green.

Figure 13A:
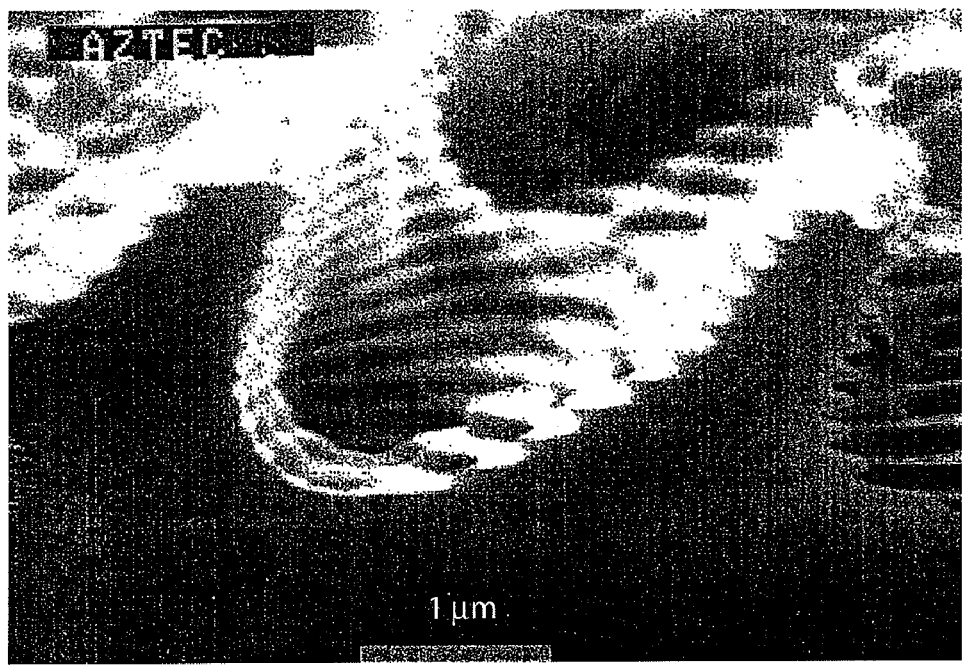
FIG. 13A is a photograph of a skewed blazed Aztec grating fabricated in photoresist.
Figure 13B:
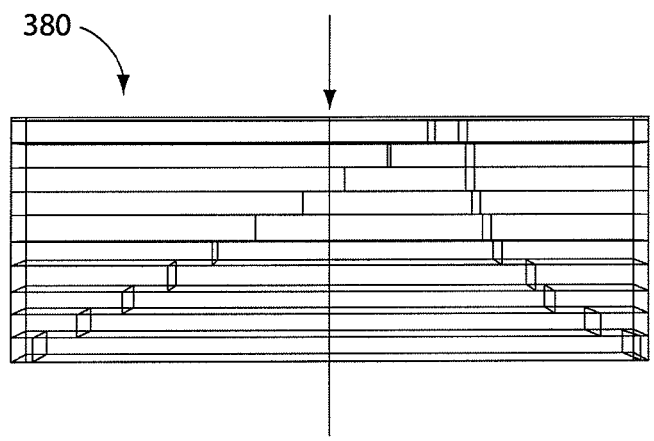
FIG. 13B is a groove profile of a ten step arbitrarily skewed grating, where the top step is shifted to a position 0.7 of the period.
Figure 13C:
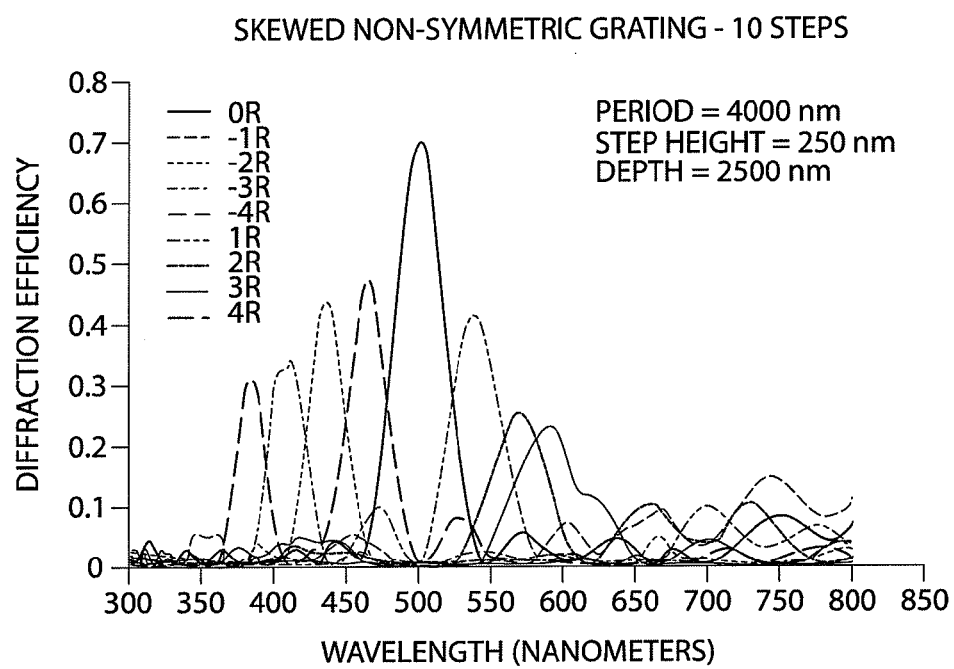
FIG. 13C is a graph of the diffraction efficiency versus the wavelength for the grating of FIG. 13B, with the grating having a period of 4 microns and a step height of 250 nanometers.
Figure 13D:
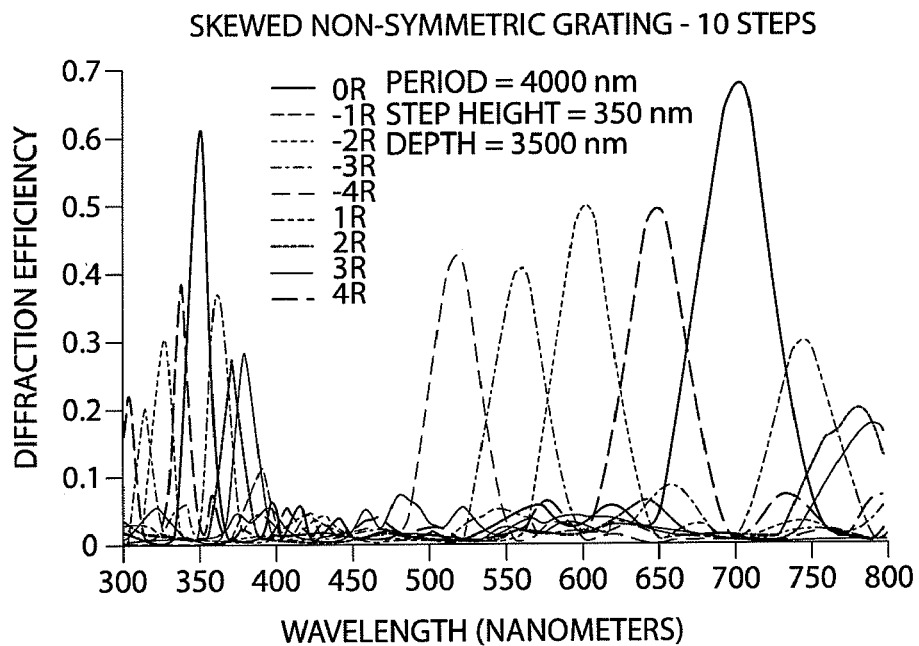
FIG. 13D is a graph of the diffraction efficiency versus the wavelength for the grating of FIG. 13B, with the grating having a period of 4 microns and a step height of 350 nanometers.
Figure 13E:
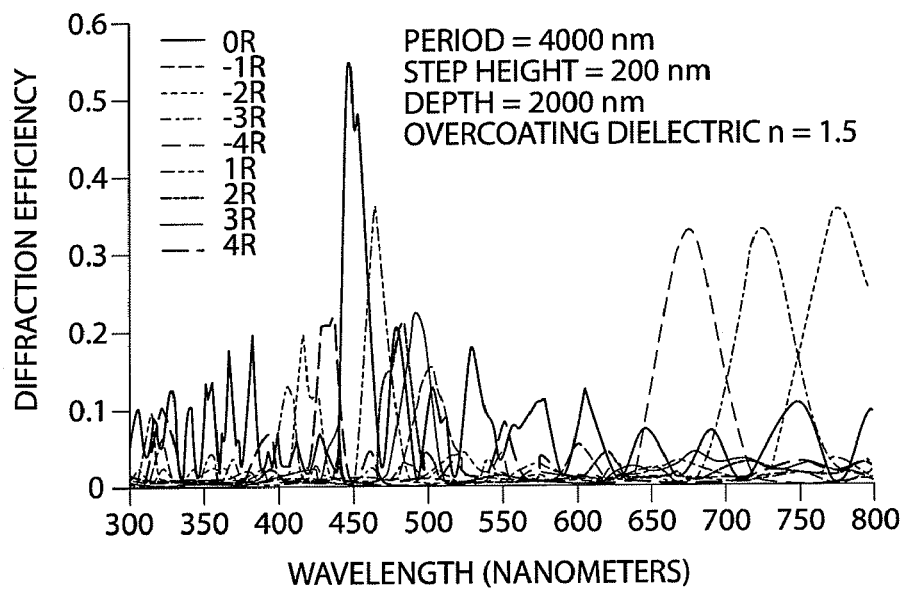
FIG. 13E is a graph of the diffraction efficiency versus the wavelength of the grating of FIG. 11B, with the grating having a period of 4 microns and a step height of 200 nanometers and overcoated with a clear dielectric having an index of refraction of n=1.5.

Referring to FIG. 13A, a photograph of an exemplary skewed non-symmetric blazed Aztec grating, fabricated in photoresist, is shown. FIG. 13B shows a skewed profile 380 prepared such that it closely simulates the actual photoresist grating profiles obtained experimentally. The grating profile 380 is skewed in such a way that its center point is at 0.65 of the period, but the short side of the profile is skewed inward as compared to the profile shown in FIG. 12A. FIG. 13C shows the results of the diffraction efficiency computations for the grating profile 380 (the step height of the steps is 250 nanometers and the dielectric is air with an index of refraction of n=1, thus resulting in a theoretical expected resonance wavelength of 500 nanometer). As shown, the resonance wavelength does indeed occur at approximately 500 nanometers. The spectral response includes several adjacent side lobes which are more predominant that the side lobes shown in FIG. 12. Accordingly, the resultant apparent color will likewise be approximately a cyan color that is more salient here than that shown in FIG. 12. FIG. 13D shows the diffraction efficiency computation results for the grating profile 380 when the step height increased to 350 nanometers (an air interface is used here too). As shown, the central resonance wavelength occurs at 700 nanometers (the expected value of two times the step height) and here too the central resonant component is accompanied by several adjacent side lobes that contribute to the overall brightness of the perceived color reflected upon illumination of a surface relief structure with this profile. The predominant color contribution in this case is red, with smaller contributions from a green color, thus yielding an apparent reddish-orange color. Referring to FIG. 13E, the diffraction efficiency computation results for the grating profile 380 in which the step height is changed to 300 nanometers, and with steps coated with a clear dielectric having an index of refraction of n=1.5, is shown. The spectral response shows resonances in both the red and blue ends of the spectrum, but little contribution from the lobes at around the green color. Thus the resultant apparent color is blue-red, or magenta.

Figure 14:
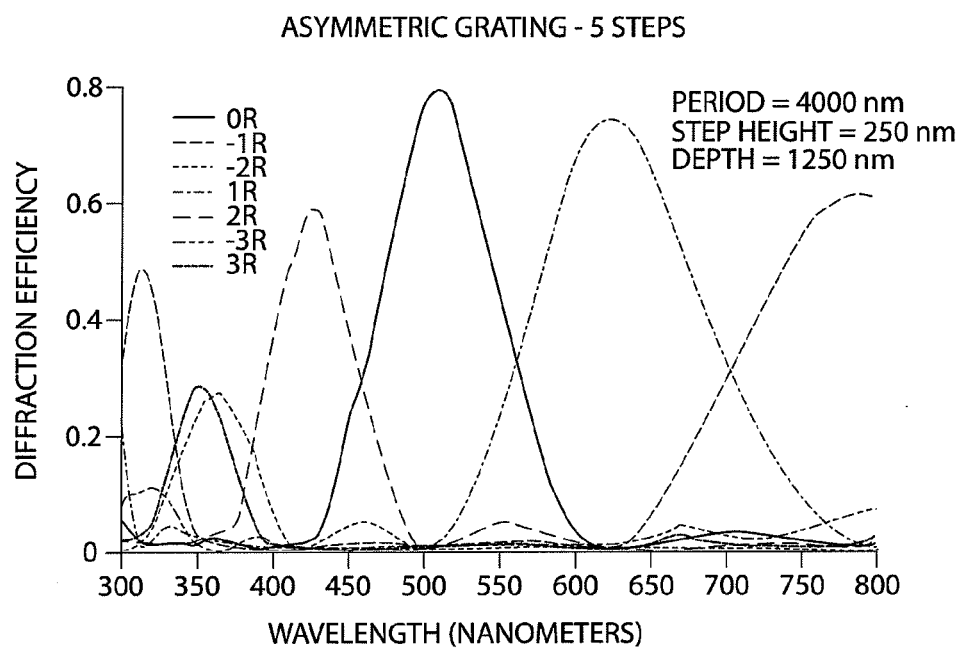
FIG. 14 is a graph of the diffraction efficiency versus the wavelength for an asymmetric grating having a period of 4 microns and five steps, each with a step height of 250 nanometers.

FIG. 14 shows the diffraction efficiency computation results (i.e., spectral distribution) for a totally asymmetric Aztec stepped profile having a period of three micrometers, and five steps at a spacing of 250 nanometers each. This grating profile is not skewed (i.e., in that it is totally asymmetric). As shown in the graph of FIG. 14, this particular structure results in a spectral response that includes three resonances within the visible spectrum, at blue, green, and red, for the −1, 0, and +1 orders, respectively (i.e., the central resonance and its two side lobes on either side of the central resonance). A hologram made in this way would show, for example, a real orthoscopic image in the 0 and +1 orders, and a virtual, pseudoscopic image corresponding to the −1 order resonance. The pseudoscopic image would appear turned inside out with respect to the real image, and it would appear on the opposite of the normal to the real image. The zero order in this case corresponds to the real image that would be observed with a standard volume hologram using materials such as DCG or silver halide.

Figure 15:
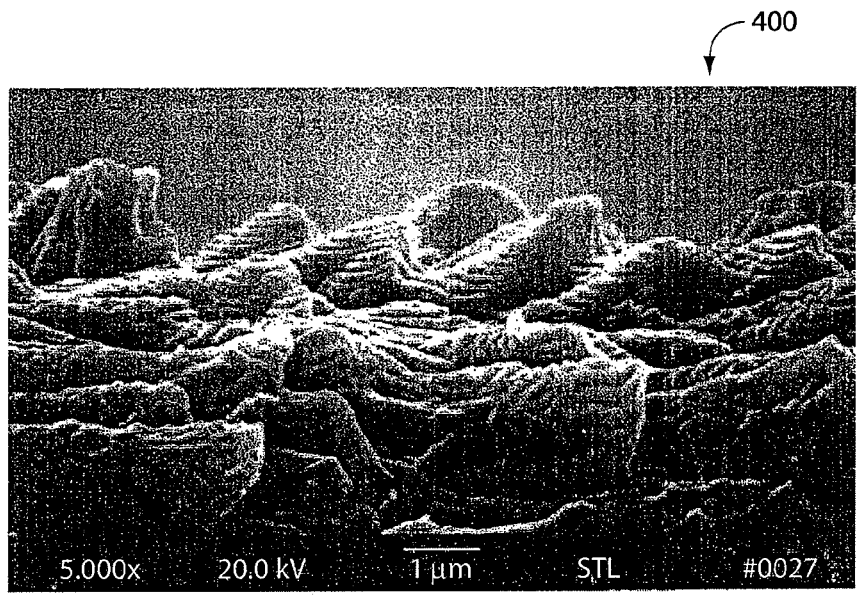
FIG. 15 is a photograph of an embossed replica in plastic of a blazed Aztec diffuse hologram.

Referring to FIG. 15, a photo of an embossed replica 400 in plastic of a blazed Aztec hologram is shown. The object whose holographic image was to be recorded was in this case a volume hologram of a diffuse surface, and was recorded as a volume hologram using, for example, a system similar to the system 200 shown in FIG. 6. The holographic recording of the volume hologram on a surface relief structure was made in a photoresist recording medium on glass. The glass was overcoated with vacuum evaporated silver and a nickel replica was made from it by electroplating. The nickel replica was then used to emboss the hologram into plastic, which in this case was rigid vinyl, using a heat press. After two minutes in the heat press, the plastic replica was allowed to cool, and was then overcoated with a vacuum evaporated layer of aluminum. The somewhat random nature of the surface is a reflection of the diffuse character of the object. The clearly defined step structure allows the diffuse image to be observed in an essentially single color.

Figure 16:
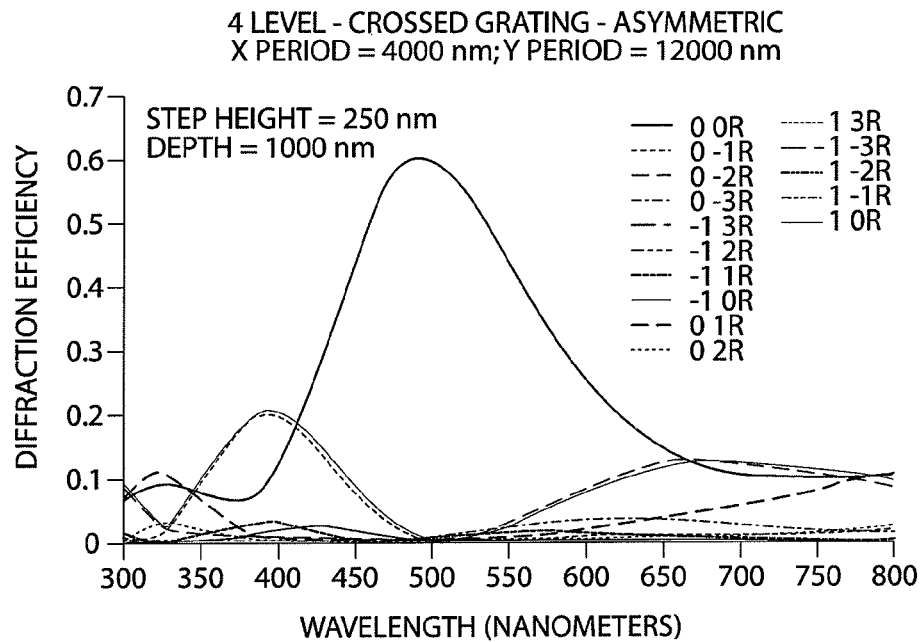
FIG. 16 is a graph of the diffraction efficiency versus the wavelength for a four level crossed grating having a period of four microns in the x-direction and twelve microns in the y-direction and whereby the step height is 250 nanometers and the total depth is 1000 nanometers.

FIG. 16 shows the diffraction efficiency computation results, as a function of wavelength, for a four-level crossed asymmetric grating, with a step-size of 250 nanometers, having an x-direction period of 4000 nanometers and a y-direction of 12000 nanometers. Such variations could, for example, be brought about by the introduction of certain variations in the y-direction due to the diffuse character of the image. As shown in FIG. 16, the grating configuration resulted in large diffraction efficiency at the central zero-order resonance and attenuated diffraction efficiency for the adjacent orders.

Figure 17:
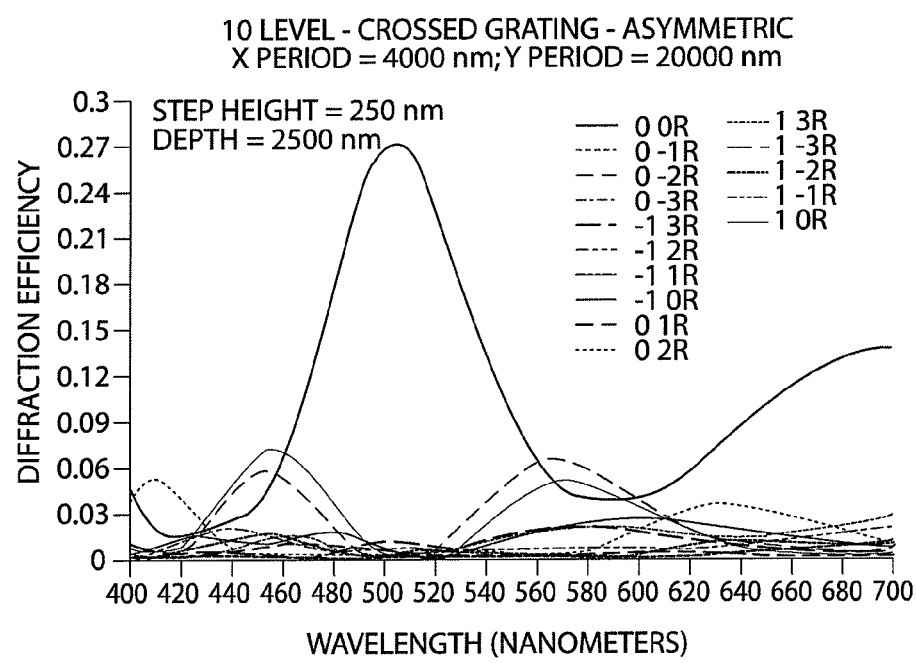
FIG. 17 is a graph of the diffraction efficiency versus the wavelength for a ten level crossed grating having a period of four microns in the x-direction and twenty microns in the y-direction, and in which the step height is 250 nanometers and the total depth is 2500 nanometers.

FIG. 17 shows the diffraction efficiency computation results, as a function of the wavelength, for a ten-level crossed asymmetric grating, with a step size of 250 nanometers, in which the x-direction period is 4000 nanometers and the y-direction period is 20000 nanometers. As shown, the spectra adjacent to the central zero-order resonance (at around 500 nanometers) are seen to be reduced in comparison to the side lobes shown in FIG. 16, while the zero-order resonance remains at high efficiency. The bandwidth of the zero-order is seen to be smaller than for the four-level case illustrated in FIG. 16 due to the larger number of steps used for the grating used in relation to FIG. 17. The graph of FIG. 17 can be compared with the graph of FIG. 10B (showing the diffraction efficiency for a one-dimensional totally asymmetric ten-level stepped grating). The grating corresponding to FIGS. 16 and 17 may be considered to be extreme cases, in that the uniformity of the grating profiles in the y-direction is altered to such an extreme degree.

Figure 18:
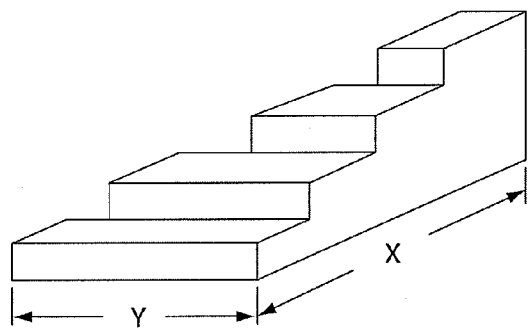
FIG. 18 is an isometric view of an asymmetric crossed four-step grating in both x- and y-directions.
Figure 19A:
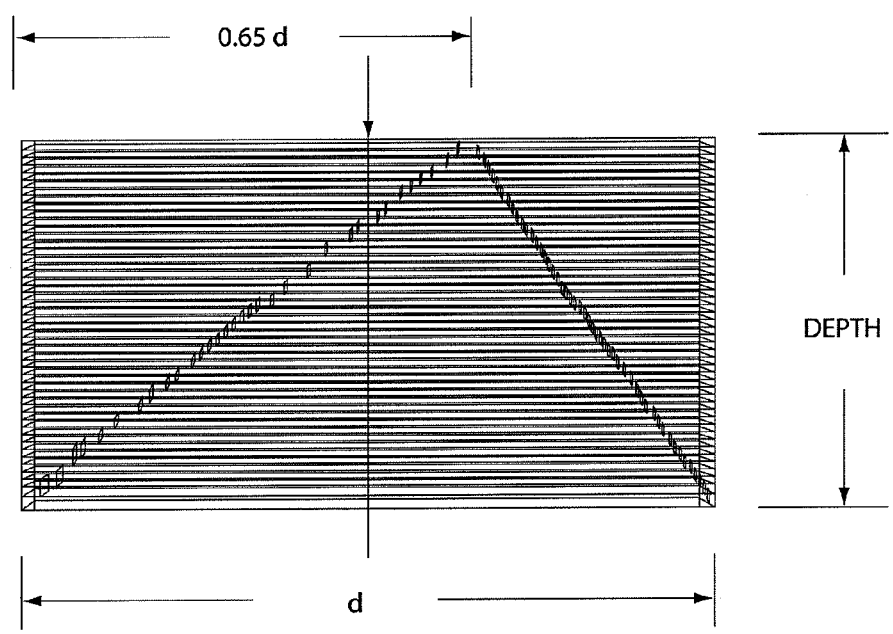
FIGS. 19A, C and E are exemplary grating profiles.
Figure 19B:
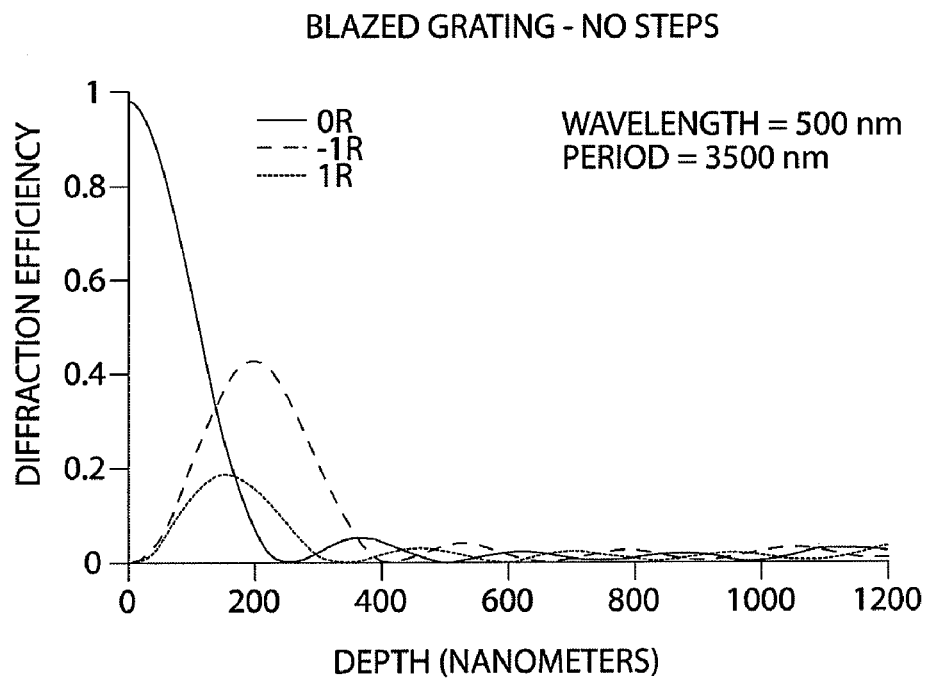
FIGS. 19B, D and F are graphs of the diffraction efficiency as a function of grating depth for the profiles of FIGS. 19A, C and E, respectively.
Figure 19C:
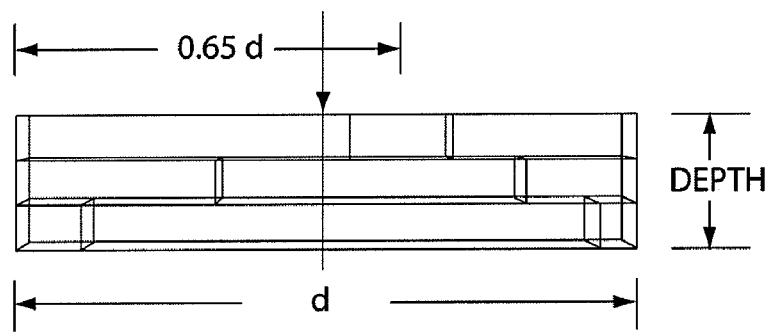
Figure 19D:
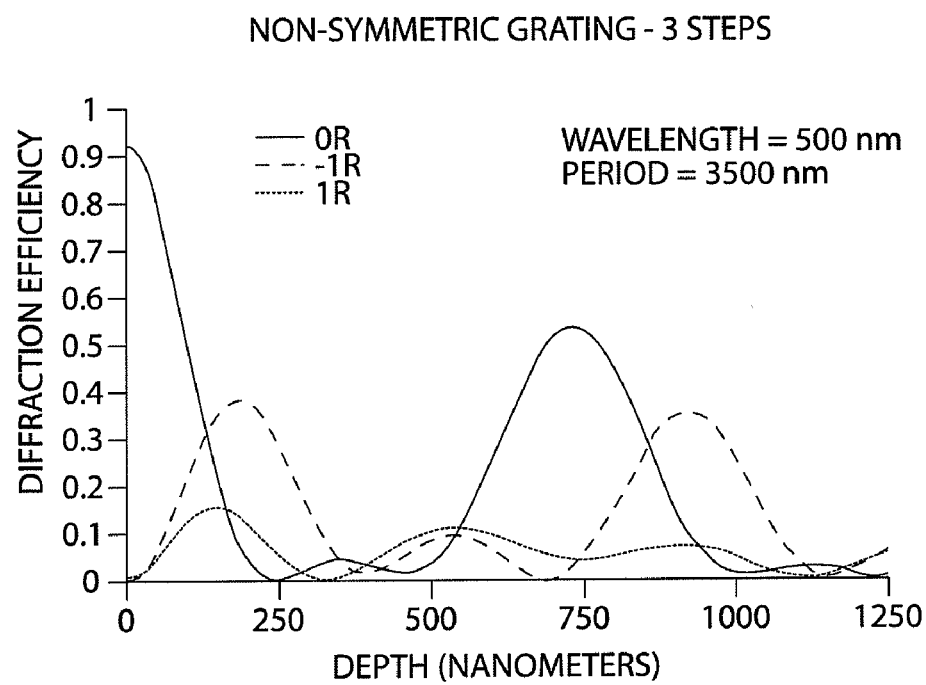
Figure 19E:
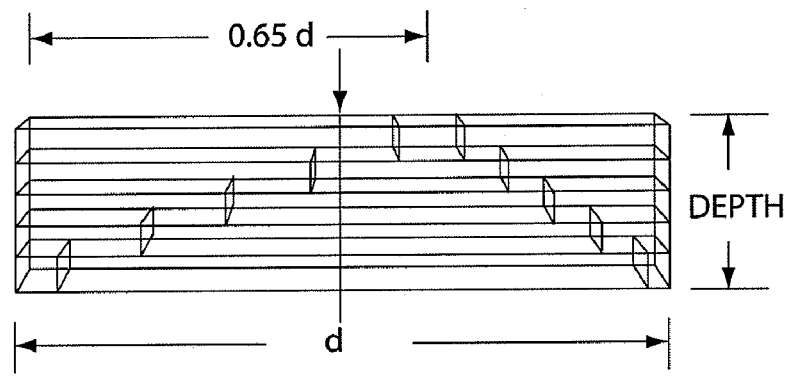
Figure 19F:
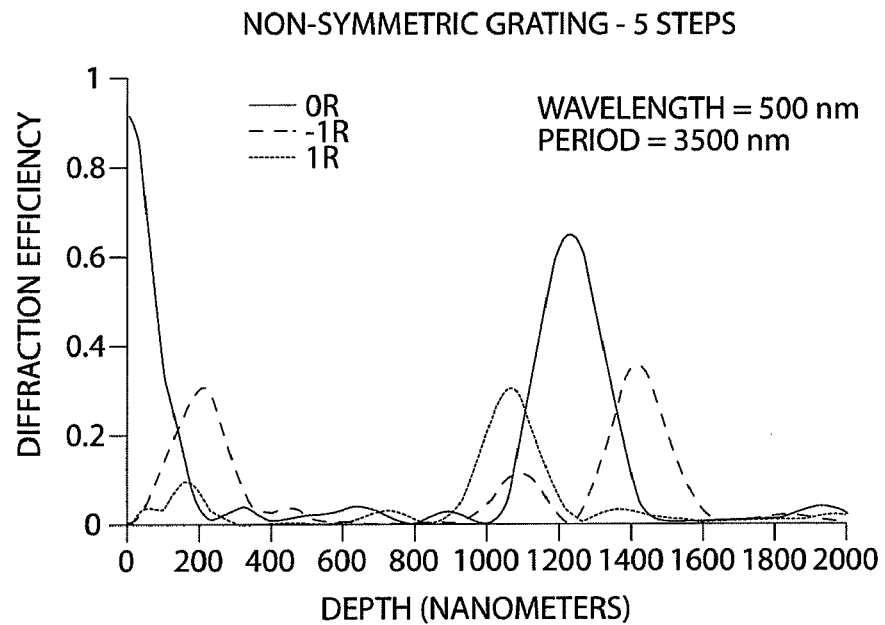
Figure 20A:
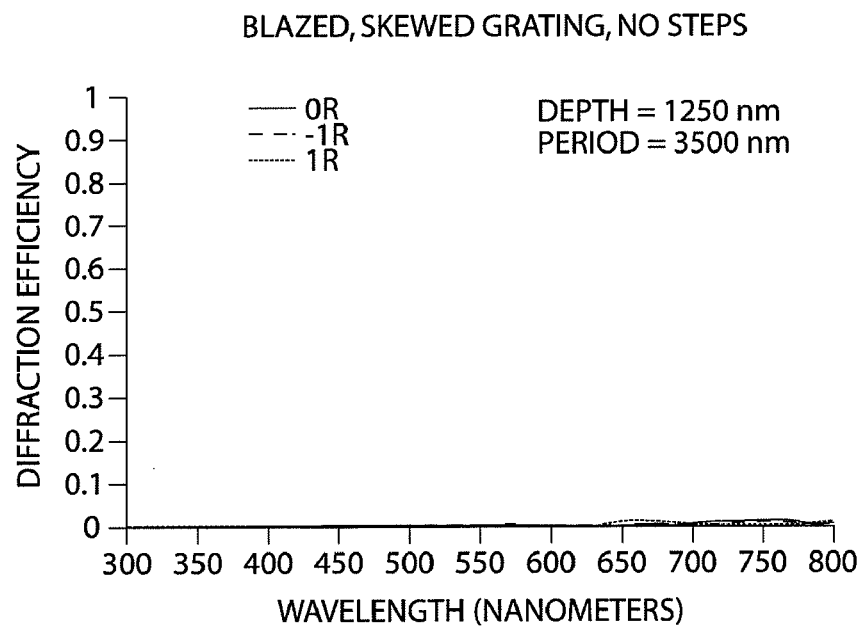
FIGS. 20A-C are graphs of the diffraction efficiency as a function of wavelength for the grating profiles of FIGS. 19A, C and E, respectively.
Figure 20B:
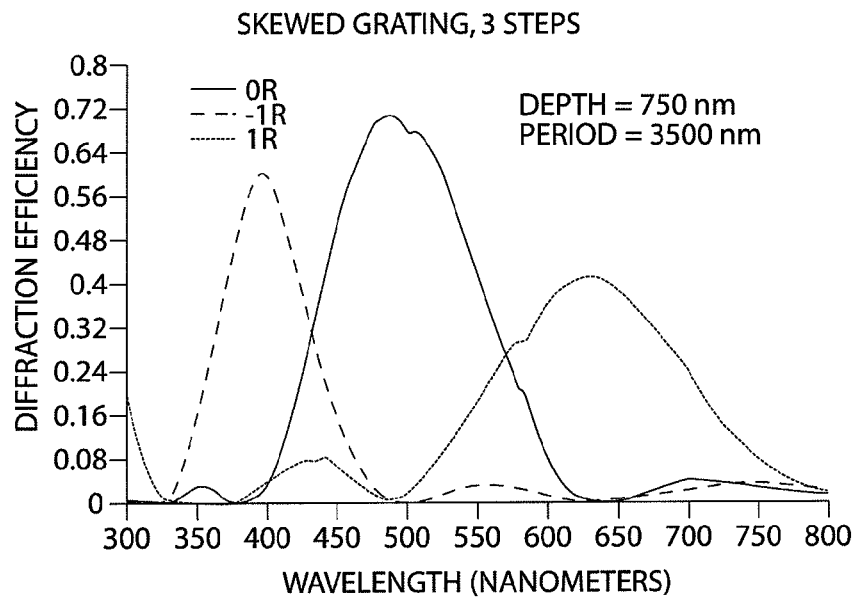
Figure 20C:
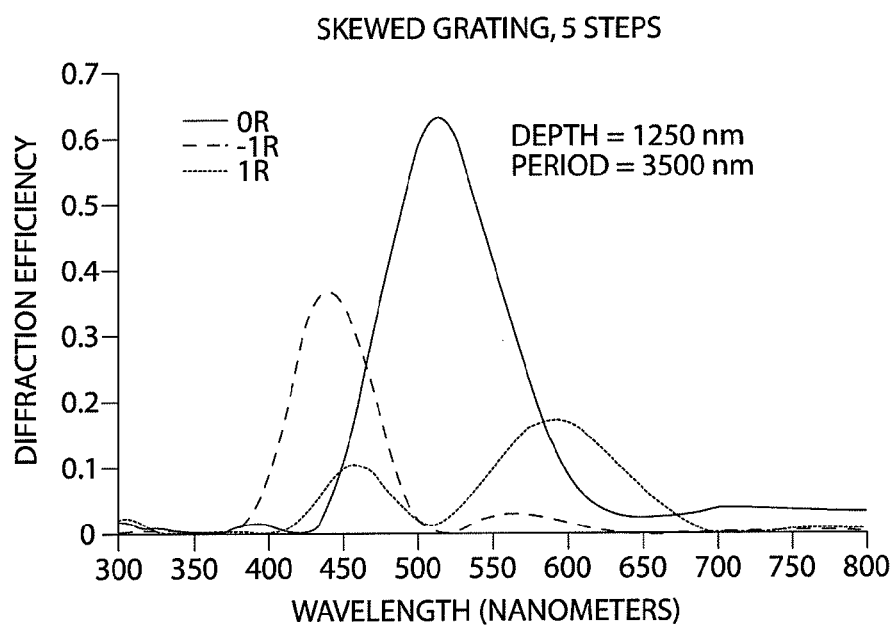

Referring to FIG. 18, an isometric view of a four-level asymmetric crossed grating that is stepped in both the x and y directions is shown. This four-level grating structure may be similar to the structure that was used for the diffraction efficiency computation of FIG. 16. In contrast, for the one-dimensional gratings that were used for the computations shown in FIGS. 9-13, the step variation was only in the x-direction.

The foregoing description has analyzed surface relief stepped structures, using the full vector theory, and has produced spectral scans covering the diffraction efficiencies in reflection from the near ultraviolet, through the visible region, to the near infrared. The analysis has considered the general case of surface relief diffraction gratings, with variations in the step heights, depth, grating periodicity, and symmetry of the grating profiles. The analysis also considered crossed-grating two dimensional profiles. For certain combinations of these variables it was shown that the diffracted light can exhibit narrow band and broadband single primary colors, such as red, green, or blue, or apparent single colors, such as cyan, yellow, or magenta. In the case where a certain narrow portion of the spectrum is delineated by an envelope of several closely spaced narrowband single colors, the diffracted light is brighter than for the corresponding case of a standard volume hologram, for which only a single resonance is visible. Furthermore, deep focus of an image is maintained, because focusing depends on the narrowness of each separate resonance.

The theoretical considerations discussed herein apply to any surface relief periodic structure, regardless of the method of formation. The emphasis in this disclosure has been on holography as the preferred method, but other techniques would be equally valid, ranging from electron-beam writing to the use of reactive ion etching and ion beam milling to deposition of alternate dielectric layers by vacuum evaporation, to name only a few.

The holographic techniques discussed here have shown that surface relief stepped structures can be obtained that produce a full diffractive spectral response in reflection throughout the entire visible spectrum. Such techniques include prism coupling and the use of intermediate standard volume holograms. In particular, the method combines interference of object light with two reference beams of light, one for surface interference patterns that lead to deep etching of photoresist, and the second for volume interference patterns that lead to well defined steps to produce single color effects. This combination additionally produces the special effects of, for example, multiple resonances that lead to high brightness and potentially large variations in color.

A number of embodiments of the invention have been described. Nevertheless, it will be understood that various modifications may be made without departing from the spirit and scope of the invention. Accordingly, other embodiments are within the scope of the following claims.

What is claimed is:

1. A surface relief structure comprising:
   a recording medium configured to be structurally modified when exposed to interfering and non-interfering portions of radiation beams, the structurally modified recording medium including, when viewed in a two-dimensional cross-section along one of axes of the recording medium:
   a plurality of substantially equal height steps of fine-sized periodicity superimposed upon a plurality of deep depressions of substantially coarse-sized periodicity defined by a crossed grating, with steps of the plurality of substantially equal height steps being stepped in only two directions and including landing portions varying non-uniformly in at least one of the only two directions, the plurality of substantially equal height steps stepped in the only two directions in each of the plurality of deep depressions defining an asymmetric stepped profile, wherein the plurality of deep depressions of coarse-sized periodicity on which the plurality of substantially equal height steps are superimposed are skewed relative to edges of the two-dimensional cross-section view of the recording medium such that the deep depressions are not perpendicular to all of the edges of the two-dimensional cross-section view of the recording medium, the structurally modified recording medium defined using the crossed grating is configured to produce in reflection substantially a single color in a broad spectral range when illuminated by a source of light.

2. The structure of claim 1 wherein the radiation beams include at least one of: light beams and electron beams.

3. The structure of claim 1 wherein the plurality of deep depressions of coarse-sized periodicity includes a grating structure varying along one direction in the two-dimensional cross-section view.

4. The structure of claim 3 wherein the period of the coarse-sized grating structure is substantially symmetric when viewed in the two-dimensional cross-section view.

5. The structure of claim 3 wherein a period of the coarse-sized grating structure is substantially asymmetric when viewed in the two-dimensional cross-section view.

6. The structure of claim 3 wherein a period of the coarse-sized grating structure is skewed when viewed in a two-dimensional cross-section view relative to a principal surface of the recording medium prior to exposing the recording medium to portions of the radiation beams.

7. The structure of claim 6 wherein the skewed grating structure includes at least one of: an inclined grating structure and a non-symmetric grating structure.

8. The structure of claim 3 wherein light diffracted, upon illumination of the structure with a light source, includes light having wavelengths corresponding to predominantly a single color resonance whose bandwidth varies in inverse proportion to a number equaling the plurality of steps.

9. The structure of claim 3 wherein light diffracted, upon illumination of the structure with a light source, includes green and blue resonances that combine to produce light corresponding to the color cyan.

10. The structure of claim 3 wherein light diffracted, upon illumination of the structure with a light source, includes green and red resonances that combine to produce light corresponding to the color yellow.

11. The structure of claim 3 wherein light diffracted, upon illumination of the structure with a light source, includes blue and red resonances that combine to produce light corresponding to the color magenta.

12. The structure of claim 1 wherein the plurality of equally spaced steps of fine-sized periodicity are approximately half of a wavelength of illuminated light observed in reflection when the microstructure is coupled to an overcoating dielectric having an index of refraction approximately equal to 1.

13. The structure of claim 1 wherein the recording medium is overcoated with a clear dielectric having an index of refraction, n, such that the illuminated light observed in reflection corresponds to a wavelength equaling to approximately twice the product of n and a height value of any of the equally spaced steps.

14. The structure of claim 1 wherein the plurality of deep depressions of coarse-sized periodicity includes a grating structure varying along in two directions of the two-dimensional cross-section view.

15. The structure of claim 14 wherein light diffracted, upon illumination of the structure with a light source, includes multiple single-color resonances of near-equal intensities.

16. The structure of claim 14 wherein light diffracted, upon illumination of the structure with a light source, includes a single color resonance that becomes narrower and bunched closer together such that it can fit under a broad spectral envelope as the number of steps increases.

17. The structure of claim 14 wherein light diffracted, upon illumination of the structure with a light source, includes a single color resonance that is accompanied by several adjacent resonances of lower intensity such that a perceived single color is modified by the spectral composition of the adjacent colors.

18. The structure of claim 1 wherein each of the plurality of deep depressions of coarse-sized periodicity has depth sufficient to diffract light that, in the absence of steps, would have a minimal diffraction efficiency.

19. The structure of claim 1 further comprising a diffuse component such that parallax viewability is increased over a large horizontal and vertical range of angles.

* * * * *